(12) United States Patent
Ueno et al.

(10) Patent No.: US 7,706,922 B2
(45) Date of Patent: Apr. 27, 2010

(54) METHOD FOR CONTROLLING PARALLEL KINEMATIC MECHANISM MACHINE AND CONTROL APPARATUS THEREFOR

(75) Inventors: Hiroshi Ueno, Niwa-Gun (JP); Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 179 days.

(21) Appl. No.: 11/779,455

(22) Filed: Jul. 18, 2007

(65) Prior Publication Data

US 2008/0039973 A1 Feb. 14, 2008

(30) Foreign Application Priority Data

Aug. 9, 2006 (JP) ............................. 2006-216478

(51) Int. Cl.
*G05B 15/00* (2006.01)

(52) U.S. Cl. ................. 700/262; 700/245; 700/249; 700/259; 700/260; 318/568.11; 318/568.16; 318/628; 318/632; 901/3; 901/9; 901/15; 414/730

(58) Field of Classification Search ................. 700/245, 700/249, 259, 260, 262; 318/568.11, 568.16, 318/628, 632; 901/3
See application file for complete search history.

(56) References Cited

U.S. PATENT DOCUMENTS

| 3,939,610 | A  | * | 2/1976  | Suzuki et al. | 451/160 |
|-----------|----|---|---------|---------------|---------|
| 4,108,019 | A  | * | 8/1978  | Martin        | 74/469  |
| 5,603,334 | A  | * | 2/1997  | Sharp         | 600/592 |
| 2004/0054438 | A1 | * | 3/2004  | Brog       | 700/245 |
| 2005/0143859 | A1 | * | 6/2005  | Matsushita | 700/245 |
| 2006/0241810 | A1 | * | 10/2006 | Zhang et al. | 700/245 |
| 2007/0255453 | A1 | * | 11/2007 | Brogardh   | 700/245 |
| 2008/0039973 | A1 | * | 2/2008  | Ueno et al. | 700/245 |
| 2008/0091383 | A1 | * | 4/2008  | Ueno       | 702/185 |

(Continued)

FOREIGN PATENT DOCUMENTS

JP            05-285788 A1    11/1993

(Continued)

OTHER PUBLICATIONS

Callegari et al., Kinematics of a Family of Parallel Translating Mechanisms, 2003, Internet, p. 1-6.*

(Continued)

*Primary Examiner*—Khoi Tran
*Assistant Examiner*—McDieunel Marc
(74) *Attorney, Agent, or Firm*—Burr & Brown

(57) ABSTRACT

First of all, in a first step S1, each actuator command value for position command value and posture command value of an end-effector is determined. Next, in a second step S2, rotational resistance values of a first and a second universal joints are obtained, and in a third step S3, the force and the moment exerted to each of the second universal joints are computed using this, and in a fourth step S4, the resultant force and the resultant moment exerted to the end-effector are determined from these. Then, in the fifth step, the elastic deformation amount of a mechanism is computed using these, and a compensation amount of the actuator command value is computed using these values. And then, in the sixth step, the actuator command values determined in the first step are updated with the compensation amount determined in the fifth step taken into account.

24 Claims, 14 Drawing Sheets

U.S. PATENT DOCUMENTS

2008/0140258 A1 * 6/2008 Ueno et al. .................. 700/260
2008/0294285 A1 * 11/2008 Shoham ...................... 700/245

FOREIGN PATENT DOCUMENTS

JP          2006-011752 A1    1/2006

OTHER PUBLICATIONS

Wavering, Parallel Kinematic Machine Research at NIST: Past, Present, and Future, 1998, Internet, p. 1-13.*
Stankoczi, Development of a New Parallel Kinematics Machine Tool, 1999, Internet, p. 1-8.*
Giberti et al., Design and experimental test of a pneumatic translational 3dof parallel manipulator, 2001, Internet, p. 1-6.*

* cited by examiner

F I G.1
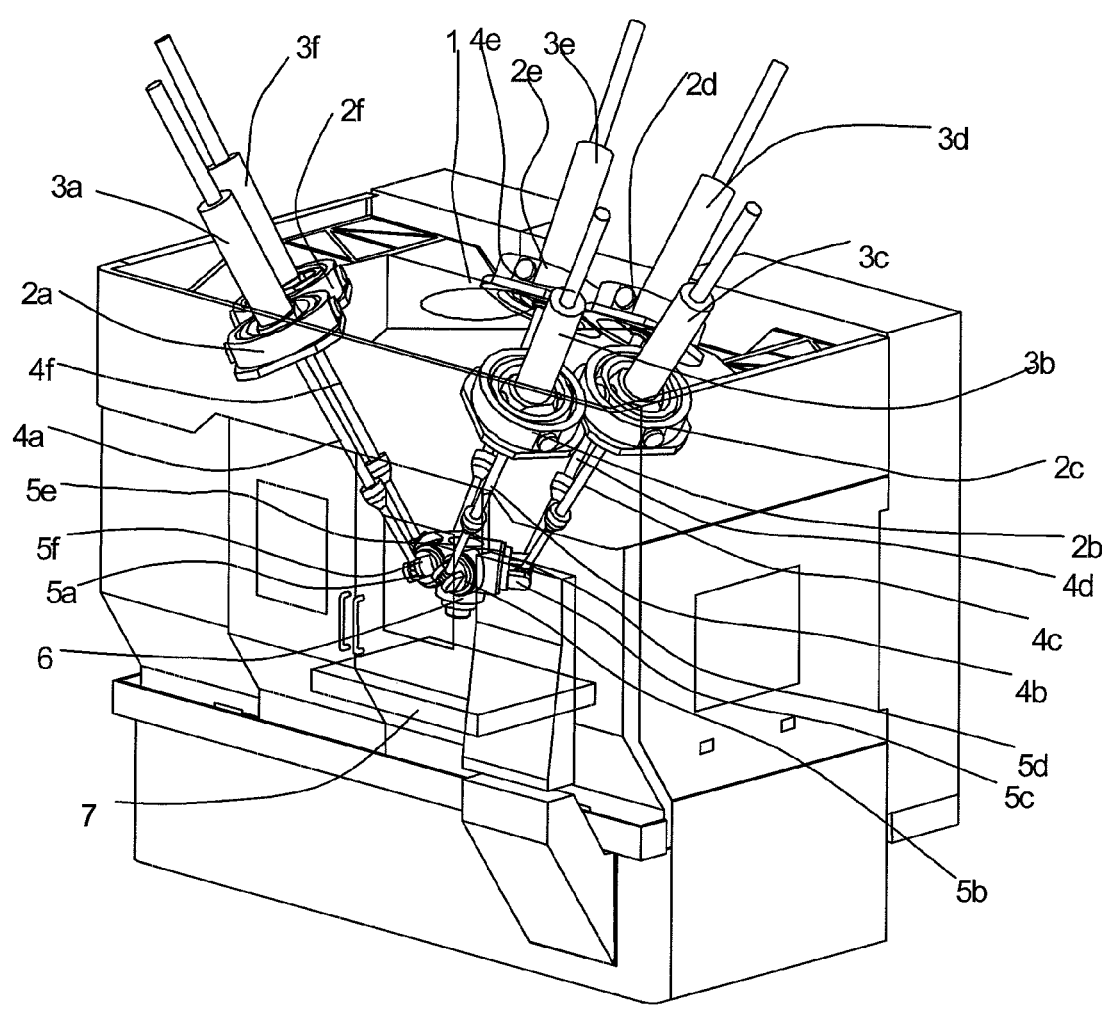

Base side passive shaft with rotational 2-degree of freedom

End-effector side passive shaft with rotational 3-degree of freedom

Active shaft with telescopic 1-degree of freedom

F I G.10
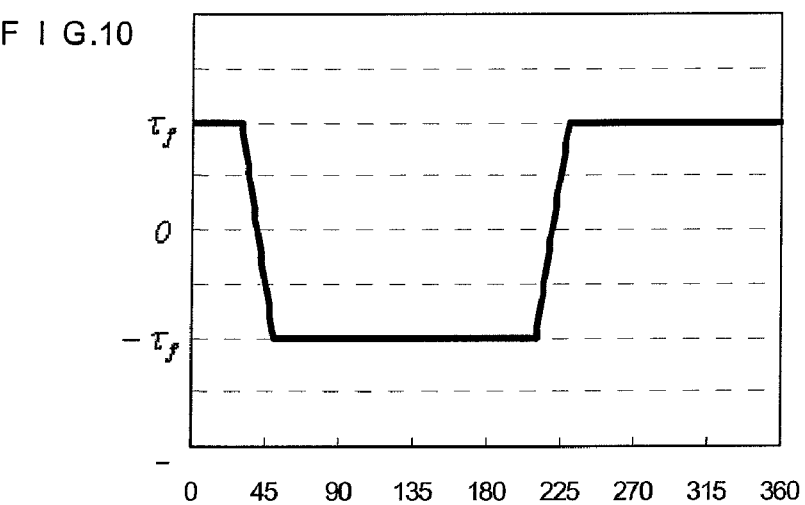
F I G.11A
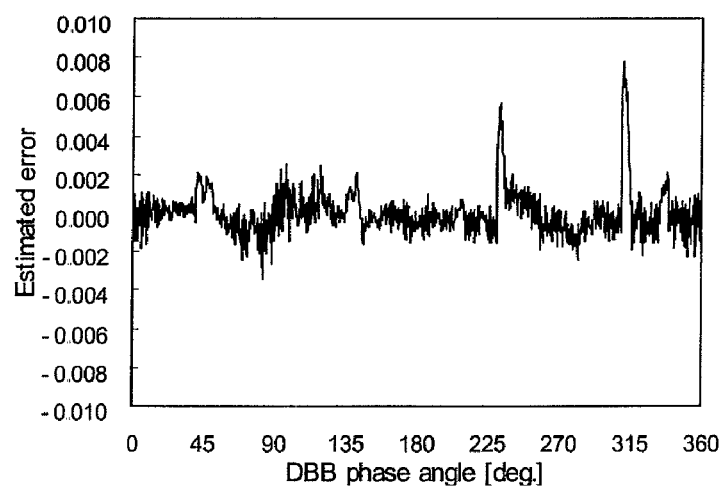
F I G.11B
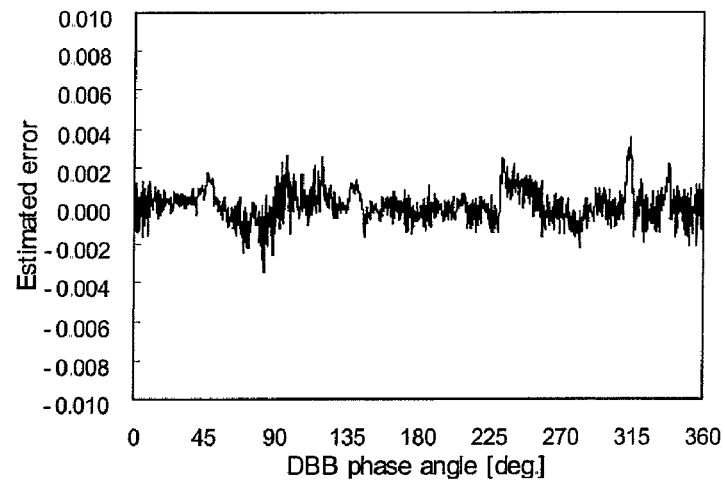

F I G. 12 A
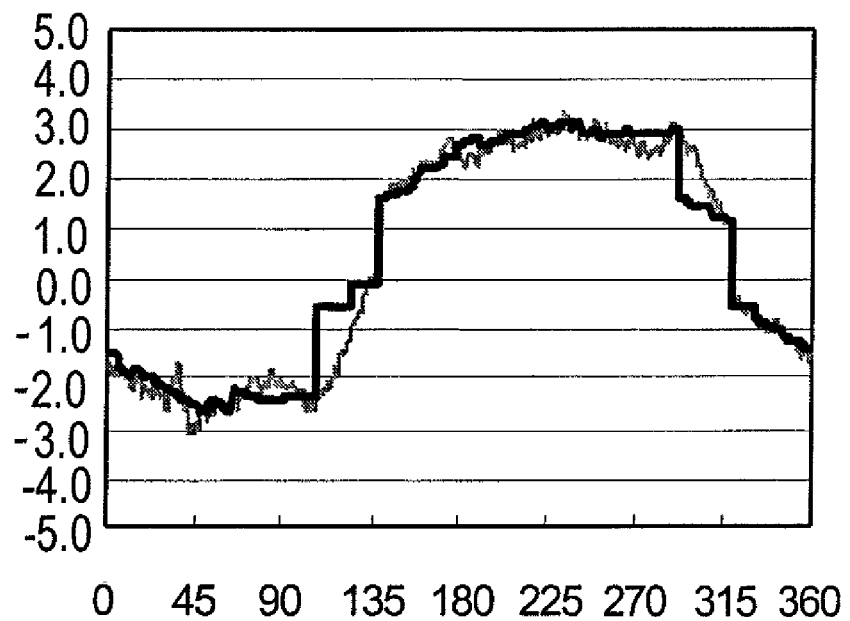
F I G. 12 B
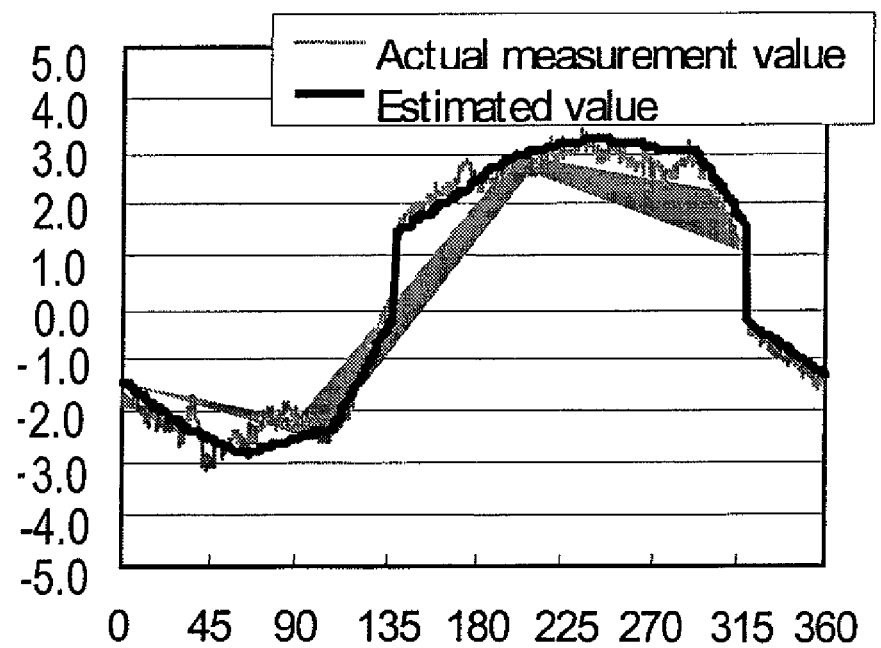

F I G. 15A
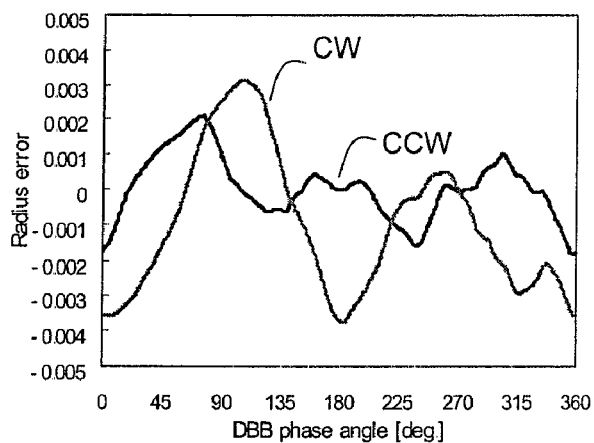
F I G. 15B
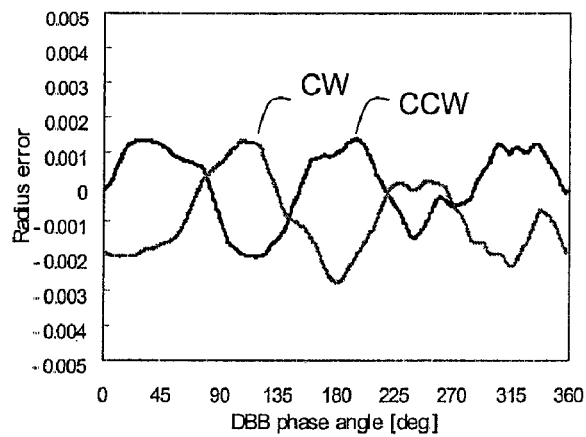
F I G. 16
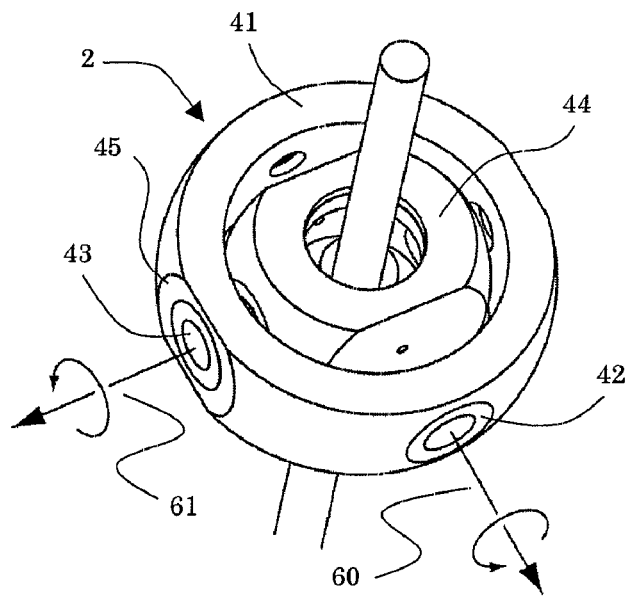

F I G.22A
F I G.22B
---
Actual measurement value
Estimated value
---
F I G.22C
F I G.22D
F I G.22E
F I G.22F
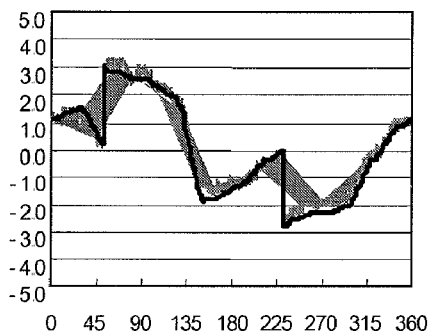
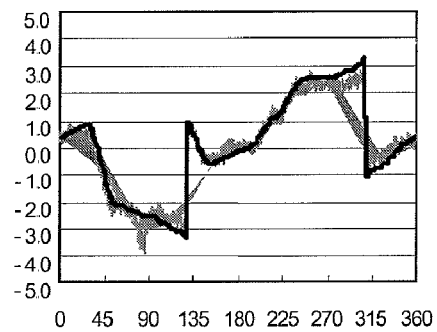
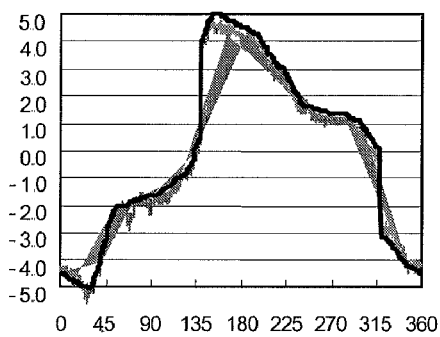
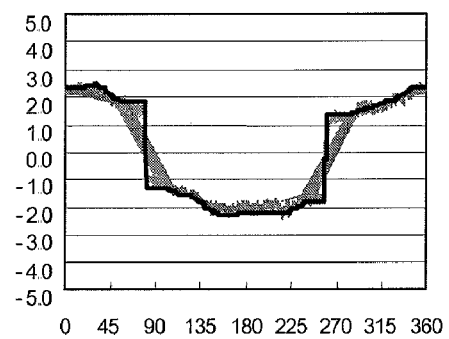
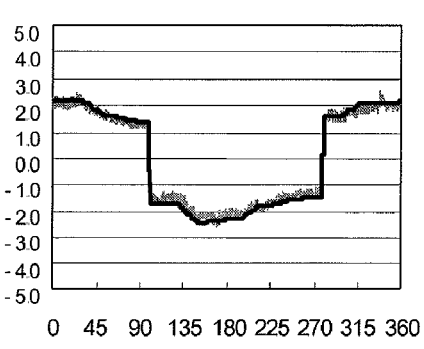
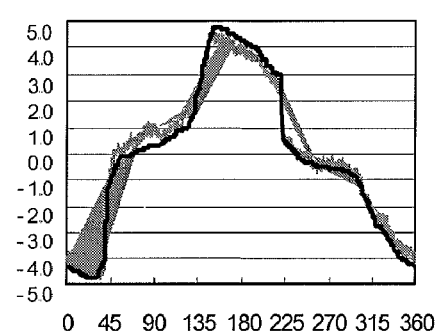

F I G.23
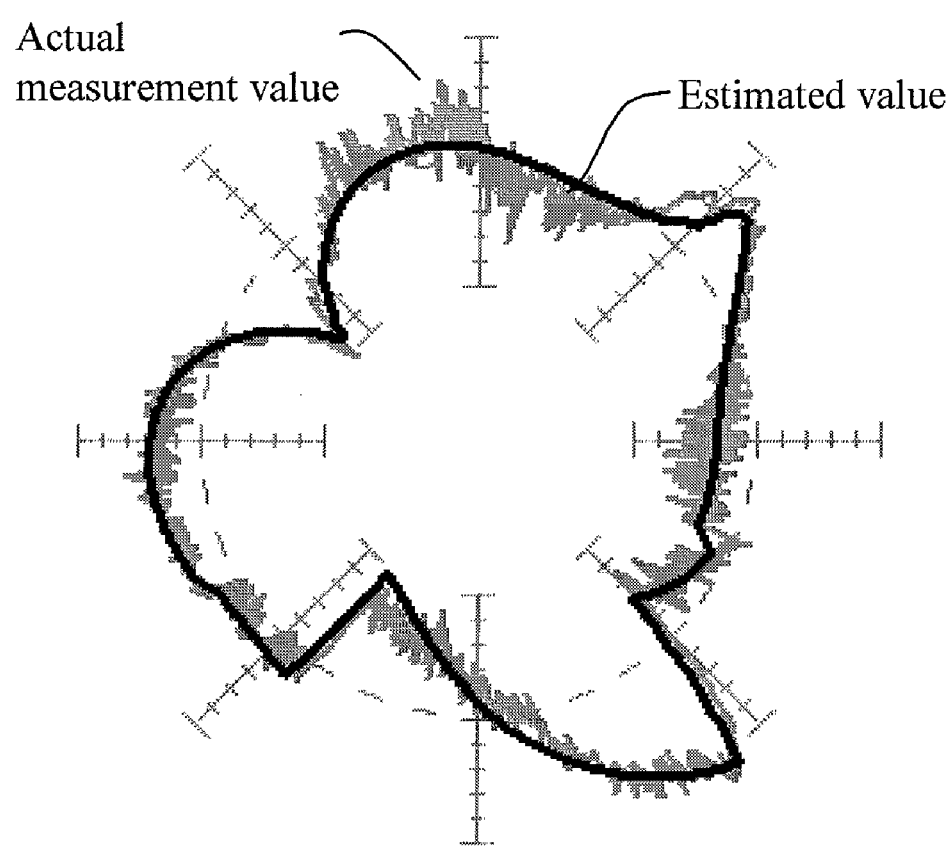

METHOD FOR CONTROLLING PARALLEL KINEMATIC MECHANISM MACHINE AND CONTROL APPARATUS THEREFOR

BACKGROUND OF THE INVENTION

This application claims the benefit of Japanese Patent Application Number 2006-216478 filed Aug. 9, 2006, the entirety of which is incorporated by reference.

FIELD OF THE INVENTION

The present invention relates to a method for controlling a parallel kinematic mechanism machine in which an end-effector, which is connected with a plurality of struts driven by actuators via joints, is moved by the struts, and to an apparatus for implementing the method.

DESCRIPTION OF THE RELATED ART

As a conventional method for controlling a parallel kinemtic mechanism machine, a method described in the Japanese Patent Application Laid-Open No. 2006-11752 is known. In this method, in a parallel kinematic mechanism machine, in order to obtain cutting resistance at the time of machining, in addition to the effect of feed resistance of an active shaft which is positively driven by actuators, disturbance is modeled with the rotational resistance generated in passive shafts which are not positively driven by the actuators, inertia term, and gravity term used as parameters, and each parameter is identified by the use of a disturbance observer to improve the machining accuracy. Now, in this method, all the passive shafts are not subjected but only a part thereof is modeled.

In addition, as conventional control apparatuses for machine tools, a control apparatus described in the Japanese Patent Application Laid-Open No. H05-285788 is known. This apparatus does not control focused on the parallel kinematic mechanism machine but performs control over diagnosis using loads of actuators of general machine tools. In this control, when the machine tool is normal, normal-time measurement data is obtained for loads of the actuators in advance, and this normal-time measurement data and the measurement data at the time of diagnosis are compared to diagnose.

By the conventional method such as the Japanese Patent Application Laid-Open No. 2006-11752, the accuracy is improved to some extent in that the rotational resistance of a passive shaft is considered in addition to the feeding resistance of an active shaft. However, since effects of the passive shafts which are not subjected are not considered, the error is increased by that much according to the conditions. In addition, the rotational resistance is identified by combinations with the factors in the conventional method. Thus, effects from the factors and effects of passive shafts blend together and error increase according to the conditions. Moreover, even when compensation using measurement values of rotational resistance in passive shafts is performed, interference with the factors occurs and high-accuracy compensation is not allowed to be obtained.

Therefore, the object of the invention according to first and fifth aspects is to provide a method for controlling the parallel kinematic mechanism machine and a control apparatus therefor that decides the end-effector position and posture with further improved accurately by performing compensation that purely extracts effects of rotational resistance only, by selecting all the passive shafts as objects for consideration and building up a model independent from effects of inertia, gravity, or the like.

In addition, the object of the invention according to ninth and tenth aspects is to provide a control method and a control apparatus of the parallel kinematic mechanism machine that eliminates effects of deformation errors of mechanical elements caused by rotational resistance and improves the estimation accuracy of kinematic parameters.

On the other hand, even when the conventional apparatus described in the Japanese Patent Application Laid-Open No. H05-285788 is simply applied to a parallel kinematic mechanism machine, diagnosis can be performed only under the measurement conditions related to the normal-time measurement data obtained in advance in a conventional apparatus. Thus, the measurement conditions at the time of diagnosis are restricted according to the conditions of the parallel kinematic mechanism machine, and it is difficult to perform accurate diagnosis when the measurement conditions differ from the measurement conditions related to the normal-time measurement data. Moreover, when detailed diagnosis targeted to specific struts or joints is performed, it is not clear under what measurement conditions, the normal-time measurement data should be obtained, and it is difficult to implement accurate diagnosis for specific struts or joints. Moreover, although normal/abnormal status of the struts or joints can be determined by comparing data with the normal-time data, it is difficult to specify abnormal joints or struts.

In addition, when a parallel kinematic mechanism machine is diagnosed, from the viewpoint of identifying abnormal portions, the control apparatus must grasp an increase of joint rotational resistance. However, in order to obtain the joint rotational resistance value, it is the only way to disassemble the joint and measure.

Therefore, the objects of the invention according to the eleventh and twelfth aspects and the sixteenth and seventeenth aspects are to provide a control method and a control apparatus of a parallel kinematic mechanism machine that can obtain the rotational resistance value of each joint easily and with high accuracy.

In addition, the objects of the invention according to the fifteenth and twentieth aspects are to provide a diagnosis control method and a diagnosis control apparatus of a parallel kinematic mechanism machine that can diagnose more accurately and also identify abnormal places by utilizing the obtained rotational resistance values at the time of diagnosis.

SUMMARY OF THE INVENTION

In order to solve the above problems, the invention according to the first aspect is a method for controlling a parallel kinematic mechanism machine having: a base fixed to the outside; a plurality of struts connected to the base via first universal joints; actuators which drive each strut; an end-effector connected to each strut via second universal joints; a control means for giving actuator command values to control each actuator; and a rotational resistance value storage means provided with the control means for storing rotational resistance values of the first universal joints and/or the second universal joints, the method including the steps of: a first step that determines each actuator command value for end-effector position command values and posture command values on the basis of predetermined kinematic parameters in the parallel kinematic mechanism machine; a second step that obtains rotational resistance values of first universal joints and/or second universal joints from the rotational resistance value storage means; a third step that computes the force and the moment exerted to each of the second universal joints by using the rotational resistance values; a fourth step that determines the resultant force and the resultant moment exerted to the end-effector from the force and the moment exerted to each of the second universal joints; a fifth step that computes an elastic deformation amount of a mechanism by using the resultant force and the resultant moment exerted to the end-effector and that computes the compensation amounts of the actuator command values using that amount; and a sixth step that updates the actuator command values determined in the first step with the compensation amounts determined in the fifth step taken into account.

In the invention according to a second aspect, in the third step, the links comprising struts, first universal joints, second universal joints are regarded as an independent serial link mechanism, respectively, and the force and the moment exerted to connections between the strut and the end-effector by rotational resistance of universal joints in relevant serial link mechanisms are computed in order to achieve the object of providing a control method that can perform highly accurate and efficient compensation with a small amount of calculation in addition to the above object.

In the invention according to a third aspect, in the third step, changes of rotational resistance values at the time of reversal of the first universal joints or the second universal joints are approximated by linear functions in order to achieve the object to provide a control method that can perform highly accurate compensation even at the time of reversing the first universal joints or the second universal joints in addition to the above object.

In the invention according to a fourth aspect, in the third step, the moving average processing is performed for the rotational resistance values of the rotary shaft which reverses at the time of reversal of the first universal joints or the second universal joints in order to achieve the object to provide a control method that can perform highly accurate compensation even at the time of reversing the first universal joints or the second universal joints in addition to the above object.

To solve the above-mentioned problems, the invention according to the fifth aspect is a control apparatus for a parallel kinematic mechanism machine including: a base fixed to the outside; a plurality of struts connected to the base via first universal joints; actuators which drive each strut; an end-effector connected to each strut via second universal joints; a control means for giving actuator command values to control each actuator; and a rotational resistance value storage means provided with the control means for storing rotational resistance values of the first universal joints and/or the second universal joints, wherein the apparatus includes: an actuator command value computing means to determine each actuator command value for end-effector position command values and posture command values on the basis of predetermined kinematic parameters in the parallel kinematic mechanism machine; a resultant force computing means that computes the force and the moment exerted to each of the second universal joints using the rotational resistance values obtained by rotational resistance value storage means, and determines the resultant force and the resultant moment exerted to the end-effector from the computed force and the moment exerted to each of the second universal joints; a compensation amount computing means that computes an elastic deformation amount of a mechanism by using the resultant force and the resultant moment exerted to the end-effector, and computes the compensation amounts of the actuator command values using that amount; and a control means that updates the actuator command values determined by the actuator command value computing means taking the compensation amounts determined by the compensation amount computing means into account.

In the invention according to a sixth aspect, the resultant force computing means regards as the links comprising struts, first universal joints, second universal joints as an independent serial link mechanism, respectively, and computes the force and the moment exerted to connections between the strut and the end-effector by rotational resistance of universal joints in relevant serial link mechanisms, in order to achieve the object to provide a control apparatus that can perform highly accurate compensation with a small calculation amount in addition to the above objects.

In the invention according to a seventh aspect, the resultant force computing means approximates changes of rotational resistance values at the time of reversal of the first universal joints or the second universal joints by linear functions in order to achieve the object to provide a control method that can perform highly accurate compensation even at the time of reversing the first universal joints or the second universal joints in addition to the above object.

In the invention according to an eighth aspect, the resultant force computing means performs the moving average processing for the rotational resistance values of the rotary shaft which reverses at the time of reversal of the first universal joints or the second universal joints in order to achieve the object to provide a control method that can perform highly accurate compensation even at the time of reversing the first universal joints or the second universal joints in addition to the above object.

In order to solve the above problems, the invention according to the ninth aspect is a method for controlling a parallel kinematic mechanism machine having an end-effector to be connected to each strut via second universal joints, actuators that drive each strut, a control means to control each actuator by giving actuator command values, and a rotational resistance value storing means provided with the control means for storing rotational resistance values of first universal joints and/or second universal joints, including the steps of: measuring the position and/or posture or measuring the distance from a fixed point when the end-effector is positioned to a plurality of positions and postures, estimating kinematic parameters of the parallel kinematic mechanism machine and performing calibration on the basis of the actual measurement values, and taking into account deformation errors by rotational resistance of the first universal joints and/or the second universal joints when computation is made to estimate the kinematic parameters by the control means.

In order to solve the above problems, the invention according to the tenth aspect is a control apparatus for a parallel kinematic mechanism machine having an end-effector to be connected to each strut via second universal joints, actuators that drive each strut, a control means to control each actuator by giving actuator command values, and a rotational resistance value storing means provided with the control means for storing rotational resistance values of first universal joints and/or second universal joints, wherein the control means measures the position and/or posture or measures the distance from a fixed point when the end-effector is positioned to a plurality of positions and postures, estimates kinematic parameters of the parallel kinematic mechanism machine and performs calibration on the basis of the actual measurement values, and takes into account deformation errors by rotational resistance of the first universal joints and/or the second universal joints when computation is made to estimate the kinematic parameters by the calibration.

In order to solve the above problems, the invention according to the eleventh aspect is a method for controlling a parallel kinematic mechanism machine having a base fixed to the outside; a plurality of struts each being connected to the base via first universal joints; respective actuators for driving each strut; an end-effector connected to each strut via respective second universal joints; and load detectors that detect a load of each actuator, the method including the step of: estimating rotational resistance values of the first universal joints and/or the second universal joints on the basis of the load detected by the load detectors.

In order to solve the above problems, the invention according to the twelfth aspect is a method for controlling a parallel kinematic mechanism machine having a base fixed to the outside; a plurality of struts each being connected to the base via first universal joints; respective actuators for driving each strut; an end-effector connected to each strut via respective second universal joints; and load detectors that detect a load of each actuator, the method including the step of: estimating rotational resistance values of first universal joints and/or second universal joints as composing elements of rotational resistance vectors, by finding relevant rotational resistance vectors of first universal joints and/or second universal joints from load vectors configured by loads detected by the load detectors, in conformity to the fact that the equation that expresses the internal force exerted to the end-effector by rotational resistance of the first universal joint and/or second universal joint, by the use of the Jacobian matrix related to each leg unit and rotational resistance vectors of first universal joint and/or second universal joint by regarding each leg unit including each first universal joint, corresponding strut, and corresponding second universal joint as a serial link mechanism, is equal to the equation that expresses the internal force exerted to the end-effector by the rotational resistance of the first universal joint and/or second universal joint by the use of the Jacobian matrix of the parallel link mechanism and load vectors of each actuator from the statics relationship of the parallel link mechanism.

In order to solve the above problems, the invention according to a thirteenth aspect is the method related to the compensation in which the rotational resistance values related to the above estimation is used.

In addition to the above objects, in order to achieve automatic updating of compensation parameters according to the condition of the parallel kinematic mechanism machine, the invention according to a fourteenth aspect is the control means updates storage of rotational resistance value estimated in the rotational resistance value storage means.

In order to solve the above-mentioned problems, in the invention according to the fifteenth aspect, when each estimated rotational resistance value of first universal joints and/or second universal joints exceeds the predetermined threshold, judgment is made that any abnormality occurs in the first universal joint or the second universal joint related to the rotational resistance value.

In order to solve the above-mentioned problems, the invention according to the sixteenth aspect is a control apparatus for a parallel kinematic mechanism machine having a base fixed to the outside; a plurality of struts each being connected to the base via first universal joints; respective actuators for driving each strut; an end-effector connected to each strut via respective second universal joints; and load detectors that detect a load of each actuator, wherein rotational resistance values of the first universal joint and/or the second universal joint are estimated on the basis of the load detected by the load detector.

In order to solve the above-mentioned problems, the invention according to the seventeenth aspect is a control apparatus that controls actuators in a parallel kinematic mechanism machine, including: a base fixed to the outside; a plurality of struts each being connected to the base via first universal joints; respective actuators for driving each strut; an end-effector connected to each strut via respective second universal joints; and load detectors that detect a load of each actuator, wherein rotational resistance values of first universal joints and/or second universal joints as composing elements of the rotational resistance vectors are estimated, by finding relevant rotational resistance vectors of first universal joints and/or second universal joints from load vectors configured by loads detected by the load detectors, in conformity to the fact that the equation that expresses the internal force exerted to the end-effector by rotational resistance of the first universal joint and/or the second universal joint, by the use of the Jacobian matrix related to each leg unit and the rotational resistance vectors of the first universal joint and/or second universal joint by regarding each leg unit including each first universal joint, corresponding strut, and corresponding second universal joint as a serial link mechanism, is equal to the equation that expresses the internal force exerted to the end-effector by rotational resistance of the first universal joint and/or the second universal joint by the use of the Jacobian matrix of the parallel link mechanism and load vectors of each actuator from the statics relationship of the parallel link mechanism.

In order to solve the above-mentioned problems, the invention according to an eighteenth aspect is a control apparatus related to the compensation and uses the rotational resistance.

In the invention according to a nineteenth aspect, the control apparatus updates storage of estimated rotational resistance value in the rotational resistance value storage means in order to achieve automatic updating of compensation parameters according to the condition of the parallel kinematic mechanism machine in addition to the problem.

In order to solve the problems, in the invention according to the twentieth aspect, when each estimated rotational resistance value of first universal joints and/or second universal joints exceeds the predetermined threshold, judgment is made that any abnormality occurs in the first universal joint and/or the second universal joint related to the rotational resistance value.

According to the present invention, the present invention achieves an effect to provide a control method and control apparatus of a parallel kinematic mechanism machine which decides the end-effector position and posture still more accurately by performing compensation selectively taking into account of effects of rotational resistance for all passive shafts and by performing compensation that purely extracts only effects of rotational resistance by building up a model independent of effects of inertia, gravity, or the like.

In addition, according to the present invention, deformation errors by rotational resistance of the first universal joint and/or the second universal joint are taken into account in the event of calculating the estimation of kinematic parameters related to calibration. Thus, effects of deformation errors of mechanical elements by rotational resistance can be eliminated and the estimation accuracy of kinematic parameters can be still more improved.

BRIEF DESCRIPTION OF THE DRAWINGS

FIG. 1 is a partial perspective view of a parallel kinematic mechanism machine to be controlled by the control method according to the present invention.

FIG. 7A shows that the present invention is not applied; and FIG. 7B shows that the present invention is applied.

FIG. 10 is a graph showing one example of transition of rotational resistance of the first universal joint or the second universal joint when a linear approximation is performed.

FIGS. 11A and 11B are graphs showing estimated error values by the DBB method: FIG. 11A shows that no linear approximation is performed; and FIG. 11B shows that a linear approximation is performed.

FIGS. 12A and 12B are graphs related to a servo motor load by the DBB method: FIG. 12A shows that no linear approximation is performed; and FIG. 12B shows that a linear approximation is performed.

FIGS. 15A and 15B are graphs of circuitry measurement results by the DBB method: FIG. 15 A shows that the calibration of FIG. 14 is not performed; and FIG. 15B shows that the calibration of FIG. 14 is performed.

FIG. 16 is an explanatory view showing the first universal joint in FIG. 1.

FIG. 22A through 22F are graphs showing actual measurement values and estimated values of a load in a corresponding servo motor.

FIG. 23 is a graph that shows actual measurement values of the DBB trajectory and the DBB trajectory determined from the estimated values related to the present invention.

DETAILED DESCRIPTION OF THE PREFERRED EMBODIMENTS

Figure 2:
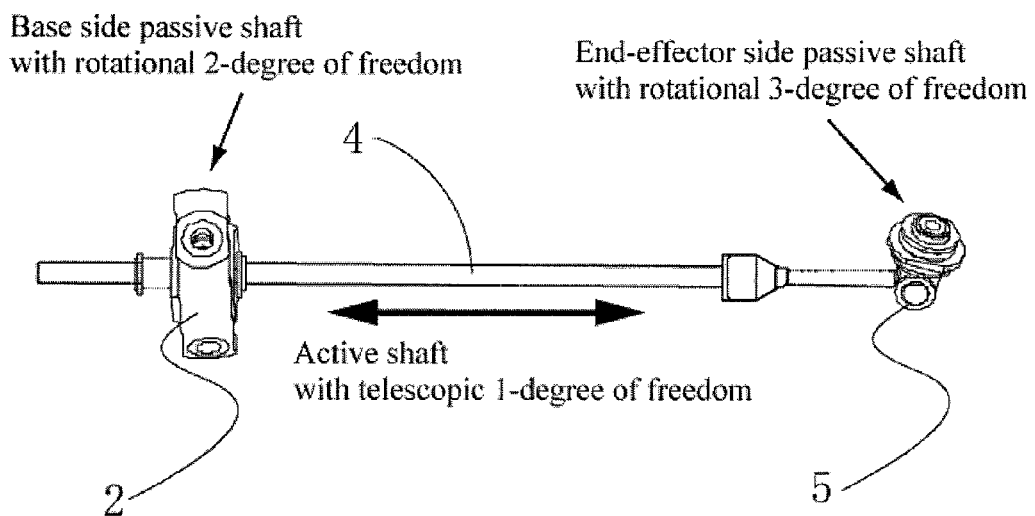
FIG. 2 is an explanatory diagram showing a leg unit in FIG. 1.

Referring to drawings, a parallel kinematic mechanism machine of embodiments according to the present invention will be described hereinafter.

FIG. 1 is an explanatory view of a Stewart platform type parallel kinematic mechanism machine with six degrees of freedom, and this parallel kinematic mechanism machine includes a frame 1 as a base fixed to a floor, six first universal joints 2a through 2f fixed to the frame 1, servo motors 3a through 3f as actuators connected to each of first universal joints 2a through 2f, and ball screws 4a through 4f as struts driven by each of the servo motors 3a through 3f, second universal joints 5a through 5f connected to the bottom end of each of the ball screws 4a though 4f, one end-effector 6 having the second universal joints 5a through 5f, and a table 7 fixed to the frame 1 at the opposite location to the end-effector 6.

Figure 3:
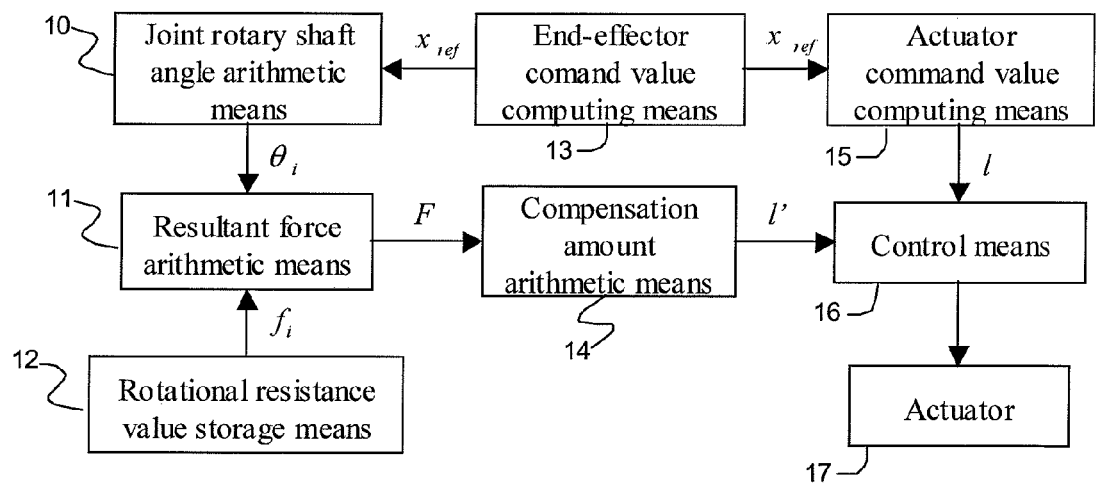
FIG. 3 is a block diagram of a control apparatus related to compensation for an actuator command value in the present invention.

The end-effector 6 includes a cutting tool mounting section and cutting tool rotating mechanism on the bottom surface. The table 7 includes a mechanism to fix a workpiece. To each of the servo motors 3a through 3f, an encoder (not shown) which outputs numerical values corresponding to the rotating angle or rotating speed from the reference state, and the information which the encoder outputs is fed back to a control means 16 (FIG. 3).

In addition, the parallel kinematic mechanism machine 1 includes a total of six sets of leg units, each being configured by the first universal joint 2a, servo motor 3a, ball screw 4a, and the second universal joint 5a. Hereinafter, in the event that components are same in each leg unit, description will be made by a representative example shown only with main reference symbols excluding a through f. Incidentally, FIG. 2 shows one set of leg units.

The first universal joint 2 has a gimbal structure using triple rings which provide rotational 2-degree of freedom. The outermost ring is fixed to the frame 1 and contains a bearing that bears a shaft in the radial direction. In addition, the center ring which has a shaft is mounted as a joint by allowing the bearing of the outermost ring to bear this shaft. Furthermore, same as the outermost and the center rings, the center and the innermost rings are mounted as joints. However, the direction of the shaft of the innermost ring crosses at right angles with the direction of the center ring shaft. In this way, by combinations of two joints, the first universal joint 2 of 2-degree of freedom is formed.

The second universal joint 5 includes a flange with rotation 3-degree of freedom, two shafts, and a rod. The flange 31 (FIG. 5) is perpendicularly fixed to the side surface which crosses at right angles with the bottom surface of the end-effector 6. The shaft 32 (FIG. 5) is mounted to the flange 31 via the bearing and rotates around the rotary shaft perpendicular to the side surface of the end-effector 6. The rod 33 (FIG. 5) is mounted to the shaft 32 via the bearing and rotates around the rotary shaft which crosses at right angles with the above-mentioned rotary shaft. Incidentally, the rod 53 is mounted to the shaft 52 and contains a bearing that rotates around its own axis and the ball screw 4 is connected to this bearing. In this way, by combinations of three bearings (joints), the second universal joint 5 with 3-degree of freedom is formed.

The leg unit of the parallel kinematic mechanism machine 1 forms a closed loop and in addition, each leg unit can be regarded as a 6-degree of freedom serial link mechanism which has one active shaft and five passive shafts as shown next. That is, each leg unit includes the ball screw 4 which is made into an active shaft by the servo motor 3, the first universal joint 2 which is a passive shaft with rotational 2-degree of freedom, and the second universal joint 5 which is a passive shaft with rotational 3-degree of freedom, and includes one active shaft and five passive shafts as a whole.

FIG. 3 is a block diagram of a control apparatus for a parallel kinematic mechanism machine. The control apparatus includes CPU (not shown), memory (not illustrated) which temporarily stores each step or the like of a program which CPU executes for control, a display unit (not shown) which displays various kinds of information, an input unit (not shown) which receives various inputs, a storage means (not shown) which stores programs or the like in memory, an interface between these and CPU (not shown), interface 17 between each servo motor 3 (actuator) and CPU, and a drive unit (not shown) for every servo motor 3. In the storage means, a joint rotary axis angle arithmetic means 10, resultant force arithmetic means 11, rotational resistance value storage means 12, end-effector command value computing means 13, compensation amount arithmetic means 14, and actuator command value computing means 15 are stored as part of programs.

Figure 4:
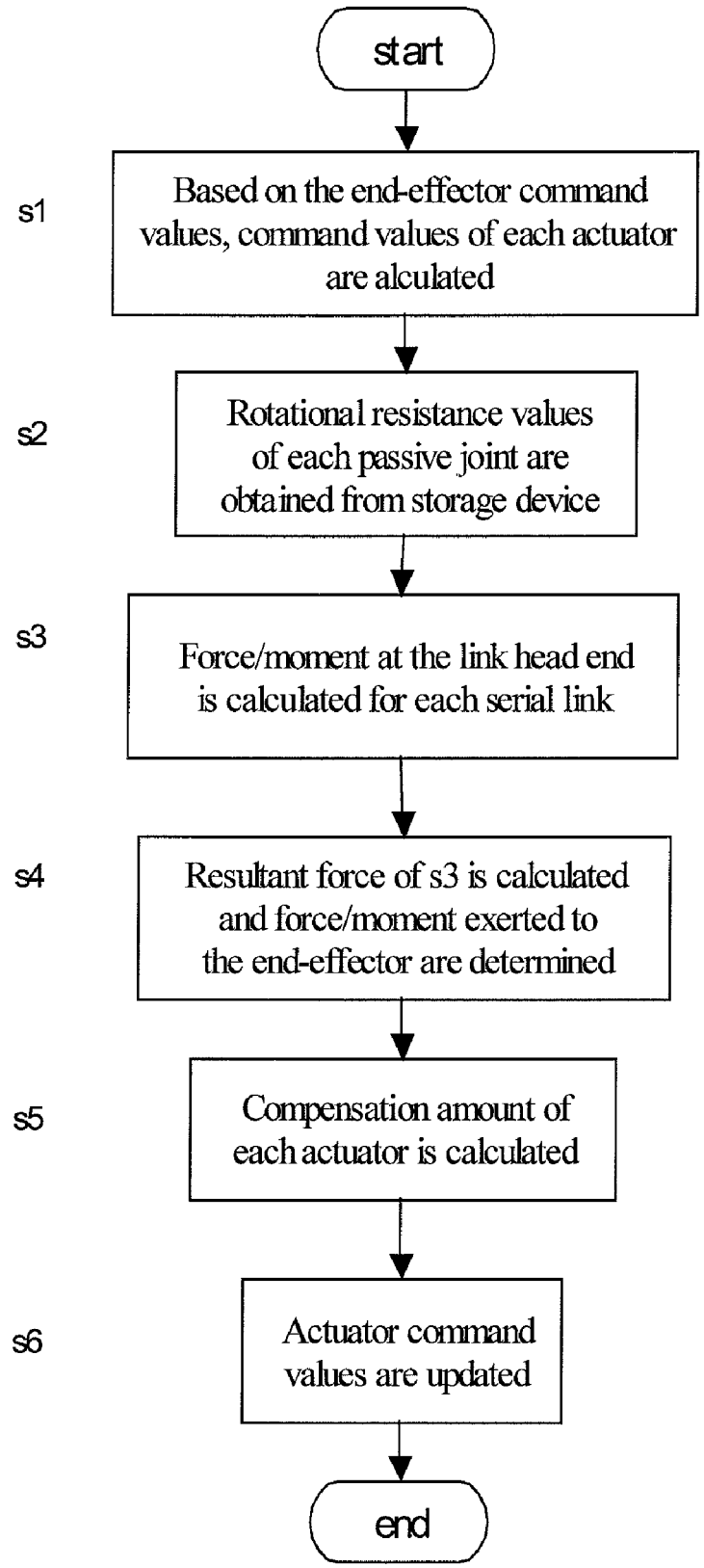
FIG. 4 is a flow chart of an embodiment concerning a control method related to compensation for an actuator command value in the present invention.

FIG. 4 shows a flow chart related to the control method which the control apparatus of the parallel kinematic mechanism machine 1 configured in this way executes. First of all, in step S1 as the first step, the actuator command value computing means 15 of the control apparatus computes the command value $l_i$ of each servo motor 3 according to the position and posture command values $X_{ref}$ of the end-effector 6. The kinematic parameters in the parallel kinematic mechanism machine 1 are rotation center position vector Qi (i: 1 to 6; successively corresponds to members related to symbols a though f; this same applies to hereinafter) of the first universal joint 2, rotation center position vector Ri of each second universal joint 5 in the coordinate system related to the end-effector 6, and strut reference length $l_{Bi}$. The actuator command value computing means 15 determines the strut length command value $l_i$ by the following [Eq. 1] from the command value $X_{ref}$ (x, y, z, a, b, c) which summarizes the position command value (x, y, z) of the end-effector 6 and posture command value (a, b, c), where E is a matrix formed by synthesizing parallel and rotational displacements related to $X_{ref}$.

$$l_i = |Q_i - E^T(R_i)| \qquad [\text{Eq. 1}]$$

Incidentally, the joint rotary shaft angle arithmetic means 10 calculates rotary shaft angle $\theta_i$ of the first and the second universal joints 2 and 5 of each leg unit. The rotary shaft angle $\theta_i$ denotes the length of the ball screw 4, too.

Next, in Step S2 as the second step, the rotational resistance $f_i$ which is the rotational resistance measurement value of each passive shaft stored in the rotational resistance value storage means 12 of the passive shaft is obtained. In the event that any optional joint is removed from the subject of consideration, the component of the relevant $f_i$ is set to 0. By this, the joint to be considered can be optionally selected.

Then, each leg unit is assumed as a 6-degree of freedom serial link mechanism as described above in order to analyze effects of the passive shaft in each leg unit of the parallel kinematic mechanism machine 1, and by the following [Eq. 2], the force and the moment exerted to the second universal joint 5 are calculated by the use of the rotational resistance value of each passive shaft (step S3 as the third step).

$$F_i = (Js_i^T)^{-1} \cdot f_i \qquad [\text{Eq. 2}]$$

Where, $f_i$: rotational resistance of passive shaft
$J_s$: Jacobian matrix of serial link
$F_i$: force exerted to the second universal joint 5 (link head end).

Furthermore, in Step S4 as the fourth step, the resultant force arithmetic means 11 of the control apparatus determines the resultant force and resultant moment (F) of internal force exerted to the end-effector 6 determined as per following [Eq. 3] from the force and the moment exerted to the head end of the link determined in Step S3, where Ti denotes transformation matrix from the second universal joint 5 to the end-effector 6 and is defined by [Eq. 4] below:

$$F = \sum_i T_i F_i \qquad [\text{Eq. 3}]$$

$$T_i = \begin{bmatrix} R_i & 0 \\ \tilde{P}_i \cdot R_i & R_i \end{bmatrix} \qquad [\text{Eq. 4}]$$

Where, $P_i$: position vector from second universal joint 5 to end-effector 6

$R_i$: rotation matrix from second universal joint 5 to end-effector 6

$\tilde{P}_i$: skew-symmetric matrix of $P_i$

The compensation amount arithmetic means 14 of the control apparatus calculates the correction value of the control amount of each servo motor 3 by the technique described in Japanese Patent Application Laid-Open No. 2005-186210 related to the previous application by the applicant of the present application using the resultant force and resultant moment F exerted to the end-effector 6 determined in Step S4, and corrects the displacement amount of the end-effector 6 (steps S5 and S6). More detail will be explained as follows.

That is, in Step S5 as the fifth step, because there is a relationship of the following [Eq. 5] between a 6-row times 6-column Jacobian matrix J determined by a known method from the kinematic parameters in the parallel kinematic mechanism machine 1 as well as the position and posture command values of the end-effector 6 and the load vector W formed from the loads $w_i$ in each strut axial direction and the above-mentioned resultant force F, determining inverse matrix $J^{-1}$ of Jacobian matrix J determines the following [Eq. 6] and the load vector W is determined, and the load $w_i$ in each strut axial direction is determined. Incidentally, the load vector W is represented by the following [Eq. 7].

$$F = J \cdot W \qquad [\text{Eq. 5}]$$

$$W = J^{-1} \cdot F \qquad [\text{Eq. 6}]$$

$$W = [w_1, w_2, w_3, w_4, w_5, w_6]^T \qquad [\text{Eq. 7}]$$

Figure 5:
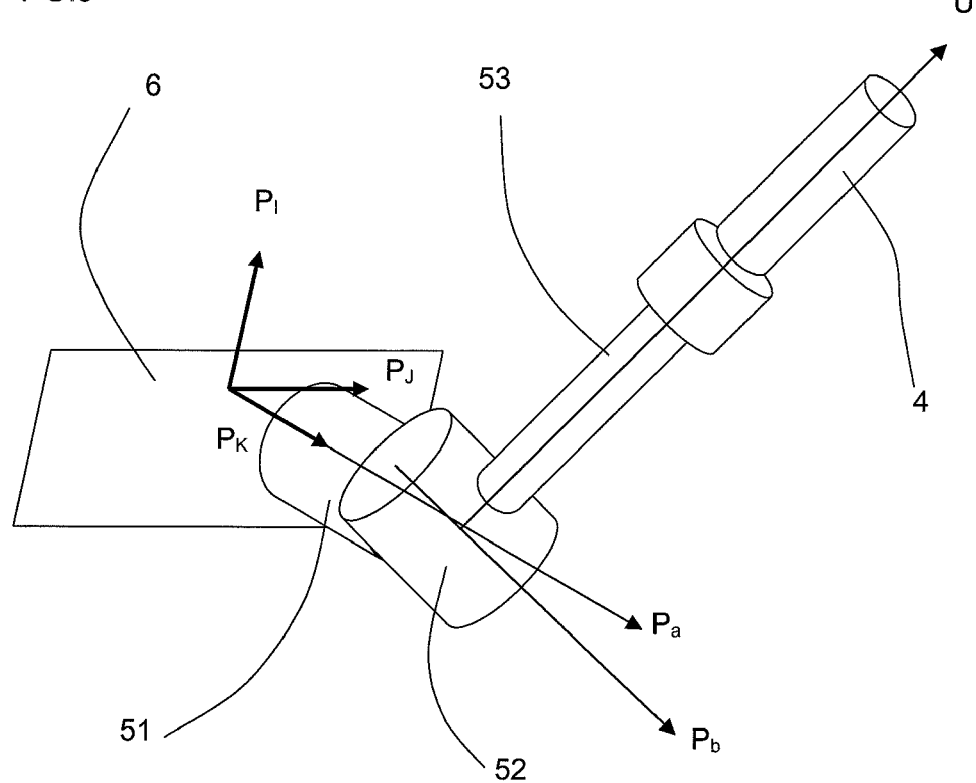
FIG. 5 is an explanatory view of rotary shaft or universal joint shaft related to the second universal joint in FIG. 1.

Furthermore, the compensation amount arithmetic means 14 calculates to decompose loads in the strut axial direction computed as above into individual joint axial directions (direction of universal joint axial) in both universal joints 2 and 5. FIG. 5 is a model of the second universal joint 5 and defines universal joint shafts $P_I$, $P_J$, $P_K$ fixed to the end-effector 6 separately from the rotary shafts $P_a$, $P_b$, $U_i$ of the second universal joint 5. However, $U_i$ is a unit vector of the strut axial direction (direction of ball screw 4). The universal joint shafts $P_I$ though $P_K$ cross at right angles to one another at the same orthogonal point and define the orthogonal coordinate system, and the orthogonal point is same as the orthogonal point of rotary shafts Pa through $P_c$ but in the figure, they are deviated to be easily seen. In addition, the rotary shaft $P_a$ and the universal joint shaft $P_K$ are taken in the same direction and the universal joint shaft $P_J$ is taken in parallel with the bottom surface of the end-effector 6, and the universal joint shaft $P_I$ is taken perpendicularly to the bottom surface of the end-effector 6.

The calculated load in each strut axial direction works on the second universal joint 5. The control apparatus decomposes the loads into respective directions of universal joint shafts $P_I$ through $P_K$ fixed to the end-effector 6 to which the second universal joint 5 is mounted. This decomposition is performed by the following [Eq. 8]. Incidentally, universal joint shafts $P_I$, $P_J$, and $P_K$ are varied by the position and posture of the end-effector 6 and differ with surfaces (angles) at which the second universal joint 5 is mounted on end effector 6 of the second universal joint 5.

$$\begin{cases} w_{PIi} = w_i(U_i \cdot P_{Ii}) \\ w_{PJi} = w_i(U_i \cdot P_{Ji}) \\ w_{PKi} = w_i(U_i \cdot P_{Ki}) \end{cases} \quad [\text{Eq. 8}]$$

where, $w_{PIi}$, $w_{PJi}$, $W_{PKi}$: loads decomposed in the universal joint shafts $P_I$, $P_J$, and $P_K$ directions $P_{Ii}$, $P_{Ji}$, $P_{Ki}$: unit vector of universal joint shafts $P_I$, $P_J$, and $P_K$.

With respect to the first universal joint 2, each strut axial direction load can be decomposed in each universal joint axial direction same as the second universal joint 5. However, for the universal joint shaft, the one fixed to the frame 1 to which the first universal joint 2 is mounted should be used. The load $w_i'$ applied to the first universal joint 2 is represented by the following [Eq. 9].

$$w_i' = w_i + w_{PCi} + w_{BSi} \quad [\text{Eq. 9}]$$

Subsequently, the compensation amount arithmetic means 14 calculates elastic deformation amount of each element in the parallel kinematic mechanism machine 1. The control apparatus first estimates the elastic deformation amount of each element in each strut axial direction (actuator axial direction). To each element of each strut axial direction, load $w_i$ in the strut axial direction works on.

The control apparatus can determine the elastic deformation amount $\Delta l_i$ in each strut axial direction as the third elastic deformation amount by the following [Eq. 10] from compliance (inverse number of rigidity) in the strut axial direction of each element and each load with consideration given to the fact that loads applied vary according to the positional relations of all elements as shown in FIG. 5. Now, $l_i'$ denotes the length which the ball screw 4 accounts for of the strut length determined by the command values of position and posture of the end-effector 6, and $C_{LOi}$, $C_{LAi}$, and $C_{LBi}$ are, respectively, a compliance of members for the ball screw 4, compliance of members of ball screw 4, and compliance converted from the ball screw 4's own strain exerted by weight of the ball screw, which successively vary according to the strut length, and $C_{MOi}$, $C_{MAi}$, and $C_{MBi}$ are, respectively, compliances of the flange 51, shaft 52 and 53, various bearings, a nut of ball screw 4, ring of the first universal joint 2, and compliances of various bearings, a nut of ball screw 4, ring of the first universal joint 2, and compliances of various bearings, a nut of ball screw 4, and rings 41 and 44 (partly omitted), which are independent of a strut length.

$$\Delta l_i = (c_{LOi} l_i' + c_{MOi}) w_i + (c_{LAi} l_i' + c_{MAi}) w_{PCi} + (c_{LBi} l_i' + c_{MBi}) w_{BSi} \quad [\text{Eq. 10}]$$

Next, the control apparatus estimates the elastic deformation amount of the second universal joint 5. Compliances of each element of the second universal joint 5 are, in general, divided into an axial direction of each bearing in the elements and a radial direction perpendicular to the axial direction. As shown in FIG. 5, to think of universal joint shafts $P_I$ through $P_K$, the axial direction of a bearing related to the shaft 51 is the universal joint axial $P_K$ direction and the radial direction is the synthetic direction of the universal joint axes $P_I$ and $P_J$. Incidentally, with respect to bearings related to the shaft 52 and rod 53, there is no need to consider a strut axial direction load, or the only strut axial load works on, and therefore, does not decompose the strut axial direction load for calculating the elastic deformation amount (first or second elastic deformation amount) of the first or the second universal joint.

Consequently, compliances of each bearing decomposed into directions of universal joint axis $P_I$ through $P_K$ can be obtained easily from a predetermined compliance. In addition, the elastic deformation amount of the second universal joint 5 can be determined from the compliances decomposed into directions of universal joint axes $P_I$ through $P_K$ and loads in the directions of universal joint axes $P_I$ through $P_K$. However, since the second universal joint 5 is fixed to the end-effector 6 and is affected deformation of the end-effector 6 caused by loads working on the second universal joint 5, this effect is linearly approximated and included. Consequently, by the following [Eq. 11], the elastic deformation amount $\Delta P_i$ of the second universal joint 5 as the second elastic deformation amount can be estimated, where $C_{PIi}$, $C_{PJi}$, and $C_{PKi}$ are compliances in directions of universal joint axes $P_I$, $P_J$, and $P_K$, respectively, and j means an axial number next to i-th ball screw 4 or the like (strut), and $K_{Pj}$ is an adjacent influence coefficient as a proportional constant.

$$\Delta P_i = (c_{PIi} w_{PIi}) P_{Ii} + (c_{PJi} w_{PJi}) P_{Ji} + (c_{PKi} w_{PKi} + k_{Pj} c_{PKj} w_{PKj}) P_{Ki} \quad [\text{Eq. 11}]$$

On the other hand, the elastic deformation amount of the first universal joint 2 can be determined in the same manner as is the case with the second universal joint 5. However, the frame 1 affects adjacence. That is, the load applied to one of the first universal joints 2 exerts effects on the mounting portion of the adjacent first universal joint 2 and deforms. In such event, of the axes of the first universal joints $Q_i$ through $Q_k$ fixed to the frame 1, effects in the direction of the first universal joint axis $Q_K$ is large and those in other directions can be ignored, and therefore, the adjacent influence coefficient is applied to the direction of the universal joint axis $Q_K$ only in [Eq. 11].

Figure 6:
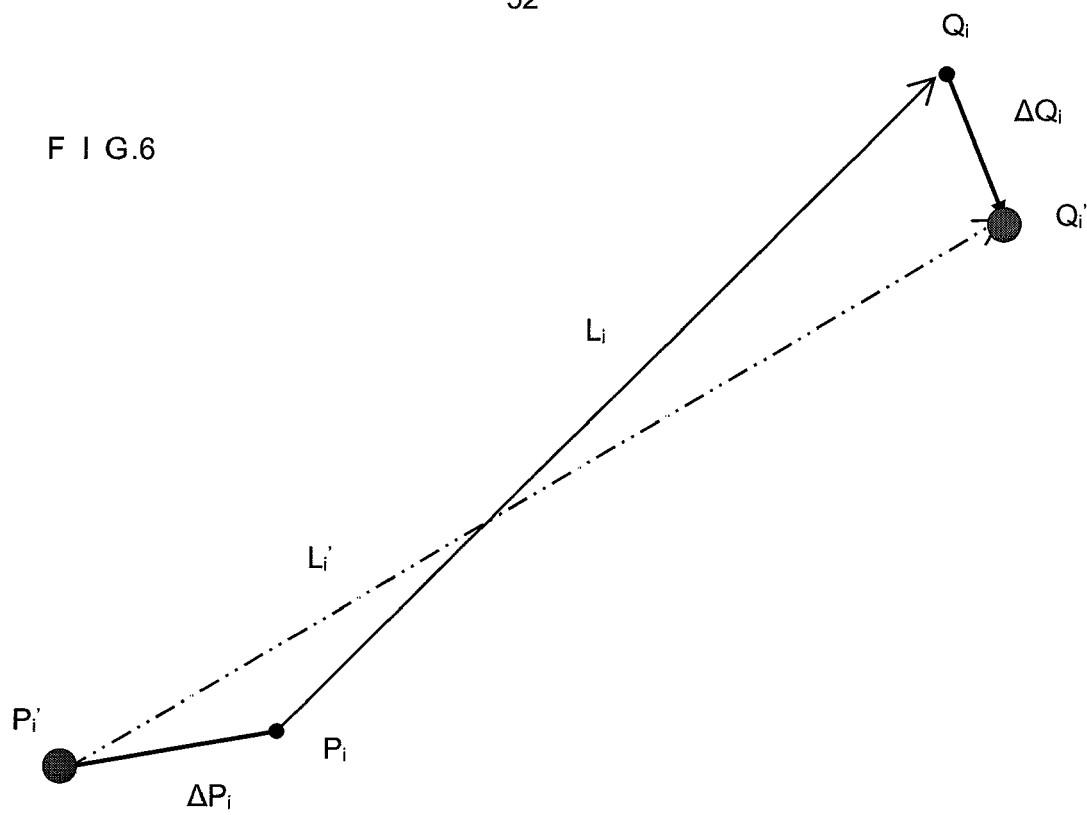
FIG. 6 is an explanatory view of relationship between the rotation center displacement and strut shaft vector related to the first and the second universal joints in FIG. 1.

Successively, the control apparatus converts the displacement caused by elastic deformation made by both universal joints into the actuator axial direction. That is, the elastic deformation of the first and the second universal joints 2 and 5 determined as described above is grasped as a shift of the rotation center of each universal joint 2 and 5. FIG. 6 shows the relation between vectors $\Delta_{Pi}$ and $\Delta_{Qi}$ of rotation center displacement of the first and the second universal joints 2 and 5 and strut axis vector $L_i$, where $Q_i$ and $P_i$ denote rotation centers of the first and the second universal joints 2 and 5 before elastic deformation, respectively, while $Q_i'$ and $P_i'$ denote rotation centers of the first and second universal joints 2 and 5 after elastic deformation, respectively, and $L_i'$ denotes the strut axis vector after elastic deformation. Based on this relation, the relationship between the displacement vector of rotation center of each universal joint and the strut axis vector can be represented by the following [Eq. 12].

$$L_i' = L_i + \Delta P_i - \Delta Q_i \quad [\text{Eq. 12}]$$

Furthermore, since a subtle displacement is made by both universal joints 2 and 5, it can be approximated to the displacement of strut axis length. That is, from the viewpoint of approximating the strut axial direction components of the rotation center displacement vectors $\Delta P_i$ and $\Delta Q_i$ to the strut axis length displacement $\Delta l_{ji}$, displacement of each universal joint 2 and 5 can be converted into the strut axis length displacement $\Delta l_{ji}$ by the following [Eq. 13]. Incidentally, in the parallel kinematic mechanism machine 1, since the strut axial direction (direction of ball screw 4) and the actuator axial direction (axial direction of the servo motor 3) are same direction, the displacement of strut axis length $\Delta l_{ji}$ can be designated as the displacement converted in the actuator axial direction.

$$\Delta l_{ji} = U_i \cdot (\Delta P_i - \Delta Q_i) \quad [\text{Eq. 13}]$$

In step S6 as the sixth step, the control means 16 of the control apparatus updates the actuator command value. That is, as shown in following [Eq. 14], displacements of each strut length, $\Delta l_i$ and $\Delta l_{ji}$, are subtracted from the target command value $l_i$ to correct for the strut length command value, that is, the actuator command value, and transmit to the interface 17.

$$l_i \leftarrow l_i - \Delta l_i - \Delta l_{ji} \quad [\text{Eq. 14}]$$

Controlling the servo motor 3 on the basis of this compensated actuator command value can offset the elastic deformation amount of the parallel kinematic mechanism machine 1. That is, it is possible to offset the elastic deformation concerning the first and the second universal joints 2 and 5 by giving a command value compensated by the initial actuator command value.

Figure 7A:
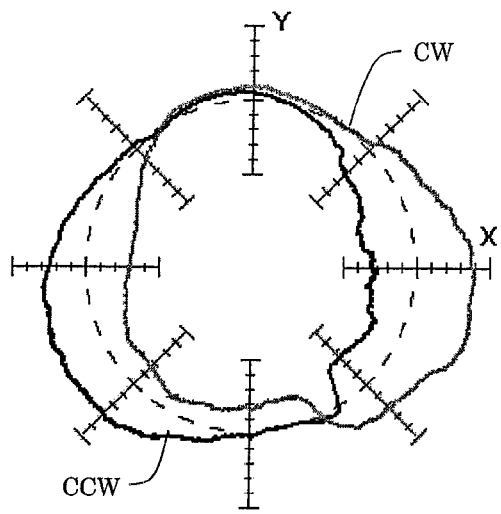
FIGS. 7A and 7B are graphs of circuitry measurement results by the DBB method in the parallel kinematic mechanism machine of FIG. 1.
Figure 7B:
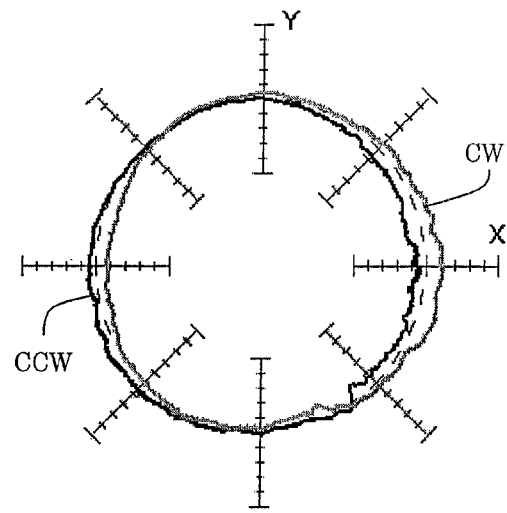

FIG. 7 shows the measurement results of circularity of circular arc trajectory by the Double Ball Bar (DBB) method using the parallel kinematic mechanism machine 1. FIG. 7A is the case in which no compensation is used and FIG. 7B is the case in which compensation related to the present invention is used. In the case with no compensation, a large hysteresis is observed due to the differences of the rotating direction, and the waveform is greatly distorted in each direction, too. On the other hand, in the case with compensation by the present invention, it is confirmed that the hysteresis is greatly improved and the circularity is remarkably improved in each direction.

However, for more detail, since in the above control, a predetermined rotational resistance $f_i$ is used, and when the rotating direction is reversed, positive and negative of the rotational resistance $f_i$ only are changed stepwise (for example, see FIG. 8), the deformation error estimated values based on this are varied stepwise, and as a result, according to the reversal of the operating direction, stepwise radius changes appear in the vicinity of reversing phase of the joint in the deformation error estimated values related to the circular arc trajectory by the DBB method. Actually, the value of rotational resistance $f_i$ continuously changes and even in the trajectory of the DBB method, the estimated value continuously changes in the vicinity of the reversing phase, and therefore, the estimated value departs from the actual measurement value in the vicinity of the reversing phase of the joint.

Therefore, in calculating the deformation error estimated value by the control apparatus, as a control to still more improve the accuracy, there is a control by adjusting the stepwise changes of the value of rotational resistance $f_i$ at the time of reversing the operating direction. And this adjustment conforms to the relationship of the force working on the end-effector 6 around the rotational axis of the first universal joint 2 and/or the second universal joint 5.

Figure 9:
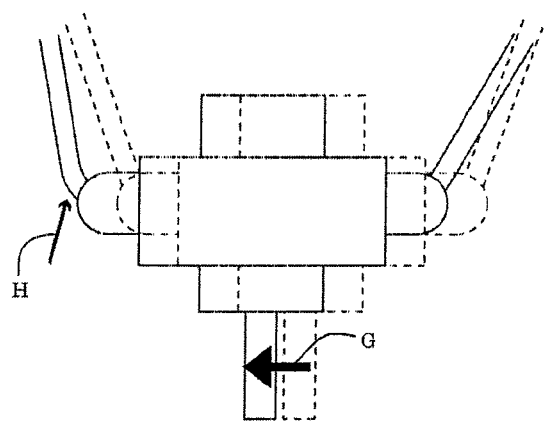
FIG. 9 is a schematic view showing deformation of a ball screw by rotational resistance of the second universal joint.

In the relations of these forces, what is important when the end-effector 6 is driven by the driving force of the servo motor 3 is the existence of the torque around the rotational axis. When this torque works on, behaviors of the first universal joint 2 or the second universal joint 5 vary according to the elastic deformation force of each element of the parallel kinematic mechanism features and the magnitude of the rotational resistance of the first universal joint 2 or the second universal joint 5. In this case, explanation will be made with the behaviors around the second universal joint 5 taken as an example. When this elastic deformation force is smaller than the rotational resistance of the second universal joint 5 (elastic deformation force<rotational resistance), the second universal joint 5 does not rotate and the mechanism elements deform in accordance with the travel of the end-effector 6 (see FIG. 9. The arrow mark G indicates the travel direction of the end-effector 6, while the arrow mark H points out the deformation of ball screw by rotational resistance force at the destination). When the deformation amount accumulates and the elastic deformation force becomes equal to the rotational resistance force (elastic deformation force=rotational resistance), the second universal joint 5 begins to rotate and thereafter, the condition progresses in the state in which the elastic deformation force balances with the rotational resistance until the second universal joint 5 stops.

Consequently, the force working on the end-effector 6 is the elastic force proportional to the elastic deformation amount of the ball screw 4 in the region before the second universal joint 5 begins to rotate and after the second universal joint 5 begins to rotate, it is the rotational resistance force of a constant value. Therefore, the torque working on the end-effector 6 after the operating direction is reversed is linearly changed right after the reversal as shown, for example, in FIG. 10 which is shown against FIG. 8, and thereafter, becomes a constant value.

Therefore, as an adjustment of the changes for the value of rotational resistance $f_i$ by the control apparatus, approximating the changes of rotational resistance $f_i$ right after the reversal by a linear function can be mentioned. This linear function uses elastic coefficients of mechanism elements as parameters and for a specific example, a function which has a gradient that corresponds to the elastic coefficient of the ball screw 4 can be mentioned.

Figure 8:
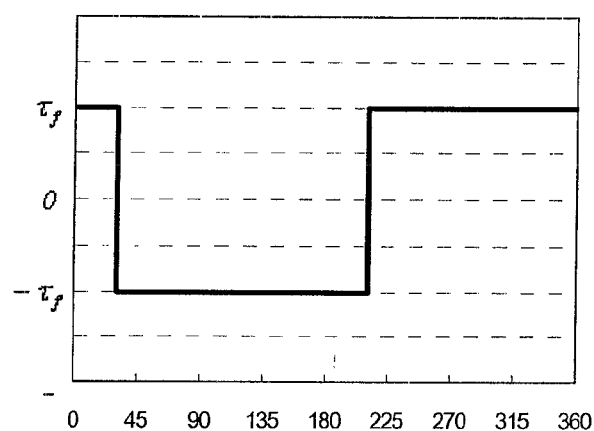
FIG. 8 is a graph showing one example of transition of rotational resistance of the second universal joint when linear approximation is not performed.

FIG. 11A shows estimated errors of the DBB trajectory when the value of rotational resistance $f_i$ is changed stepwise in a discontinuous manner as shown in FIG. 8, and FIG. 11B shows estimated errors of the DBB trajectory calculated by the control apparatus when linear approximation is performed as shown in FIG. 10. The figures indicate that these could reduce estimated errors in the case of linear approximation and achieve a high degree of coincidence concerning actual measurement values and estimated values. FIG. 12A shows loads of the servo motor 3 when the value of rotational resistance $f_i$ is changed stepwise in a discontinuous manner as shown in FIG. 8 and FIG. 12B shows loads of the servo motor 3 when linear approximation is conducted as shown in FIG. 10. The figures indicate that when linear approximation is conducted, the estimated values come more close to the actual measurement values, in particular, in the vicinity of the reversing action. Consequently, even in a transitional region associated with the reversal of the operating direction, it is confirmed that conducting linear approximation for changes of rotational resistance $f_i$ can improve the accuracy of the estimated value.

Incidentally, approximation to a linear function for changes of rotational resistance $f_i$ is performed by the control apparatus which distinguishes whether the rotational resistance $f_i$ changes from positive to negative or changes vice versa with the reversing phase set as a reference, or is performed by assigning moving average scores to parameters in place of elastic coefficients of mechanism elements focusing on the fact that conducting moving average processing for FIG. 8 can obtain waveforms equal to those of FIG. 10. In particular, in the latter case, as compared to the former, changes corresponding to FIG. 10 can be obtained without special processing such as distinguishing, or the like and the throughputs can be still more reduced while the accuracy is being maintained.

Figure 13:
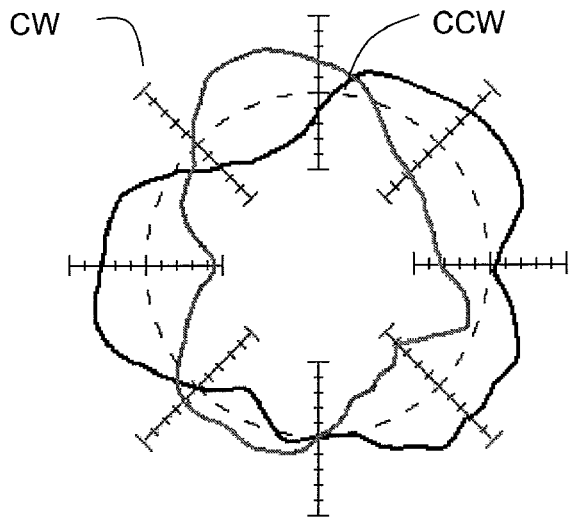
FIG. 13 is a graph showing one example of deformation error amount that appears in the DBB trajectory by rotational resistance of the first universal joint and/or the second universal joint.
Figure 14:
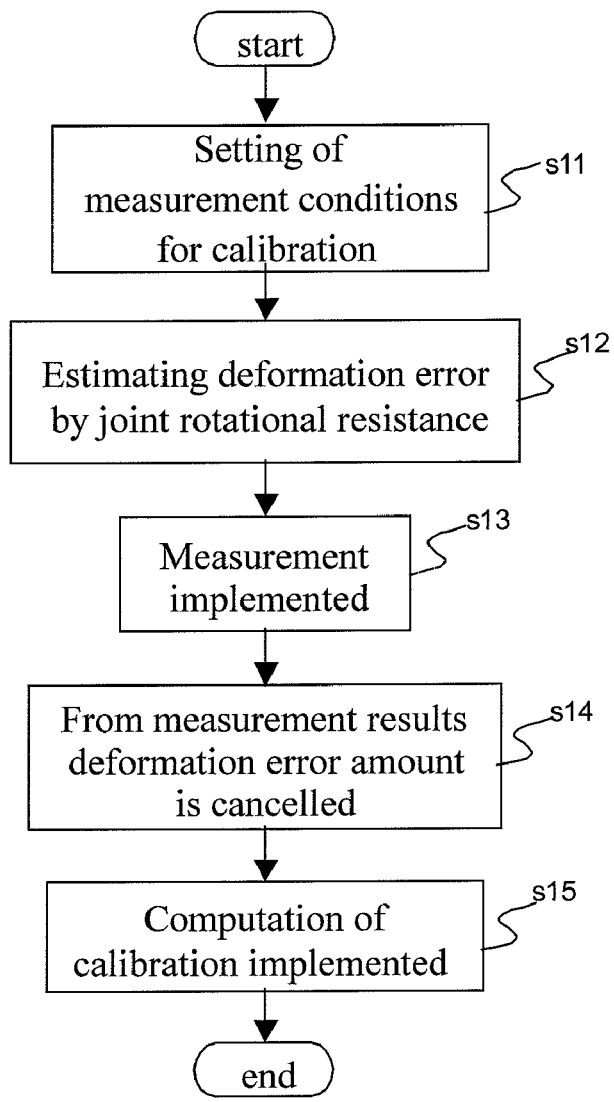
FIG. 14 is a flow chart of an embodiment related to calibration to the parallel kinematic mechanism machine of FIG. 1.

Referring now to the effects of parallel kinematic mechanism to the calibration by rotational resistance of a joint on calibration. As described above, the rotational resistance $f_i$ of the first universal joint 2 and/or the second universal joint 5 may cause the change of deformation errors by the operating direction as shown, for example, in FIG. 13, even if the end-effector 6 is located at the same position and takes the same posture. Consequently, conducting calibration of the parallel kinematic mechanism machine 1 without the rotational resistance $f_i$ of the first universal joint 2 and/or the second universal joint 5 taken into account may vary calibration results depending on the operating direction at the time of calibration, and may vary or comparatively degrade the accuracy in calculating estimated values of kinematic parameters which are objectives of calibration. Consequently, as shown in FIG. 14, conducting calibration by the control apparatus with rotational resistance $f_i$ of the first universal joint 2 and/or the second universal joint 5 can eliminate effects of disturbance by this rotational resistance and can improve the calibration accuracy.

That is, the control apparatus performs the setting of measurement conditions for calibration as is the case with general calibration (Step S11). Examples of measurement conditions include measurement position, posture, operating direction (in this case, counterclockwise, that is, CCW direction, is assumed but even in the opposite case, the following can be applied in the same manner).

The control apparatus determines the amount of radius error $\Delta r_{fi}$ related to the rotational resistance $f_i$ of the first universal joint 2 and/or the second universal joint on the basis of the above-mentioned strut axis length displacement $\Delta l_i$ and $\Delta l_{fi}$ (Step S12). That is, the control apparatus determines the strut axis length displacement $\Delta l_i$ and $\Delta l_{fi}$ at each measurement point in accordance with the measurement conditions in calibration and based on these relations, determines the amount of radius error $\Delta r_{fi}$ in each measurement point. Then, the control apparatus implements measurements according to the above-mentioned measurement conditions (Step S13).

The control apparatus removes the amount of radius error $\Delta r_{fi}$ related to deformation from the measurement results and corrects the measurement results as described below (Step S14). That is, to express n pieces of kinematic parameters as per [Eq. 15] shown below, the relation with the center-to-center distance $r_i$ of two spheres in measurement of DBB trajectory is, in general, represented by [Eq. 16] shown next, and linearly approximating this produces [Eq. 17] shown next. In this [Eq. 17], no error component caused by rotational resistance of the first universal joint 2 and/or the second universal joint 5 is taken into account, and to have an equation with this added, [Eq. 18] shown next is obtained. By [Eq. 18], more accurate radius error $\Delta r_i$ can be expressed. Consequently, the control apparatus can obtain the measurement results with the amount of radius error $\Delta r_{fi}$ cancelled by substituting the amount of radius error $\Delta r_{fi}$ determined in Step S12 into this [Eq. 18].

$$P = [p_1, \ldots, p_n]^T \quad \text{[Eq. 15]}$$

$$r_i = g(P, X_i) \quad \text{[Eq. 16]}$$

where,
 g: direct kinematic function
 $X_i$: command value at the i-th measurement point
 $r_i$: measurement value at the i-th measurement point $$\Delta r_i = \sum_{j=1}^{n} \frac{\partial g_i}{\partial p_j} \Delta p_j \quad \text{[Eq. 17]}$$

$$\Delta r_i = \sum_{j=1}^{n} \frac{\partial g_i}{\partial p_j} \Delta p_j + \Delta r_{fi} \quad \text{[Eq. 18]}$$

where, $\Delta r_{fi}$: amount of radius error by rotational resistance at the i-th measurement point.

Thereafter, the control apparatus obtains the kinematic parameter $\Delta pj$ subtracted by effects of the amount of radius error $\Delta r_{fi}$ based on rotational resistance $f_i$ by continuously solving [Eq. 18] for kinematic parameter $\Delta p_j$, and based on this, the control apparatus performed calibration not affected by rotational resistance $f_i$ (Step S15). When the number of measurement points of the DBB trajectory is m points, m pieces of simultaneous equations of [Eq. 18] are formed and the simultaneous equation can be expressed by a matrix as shown as [Eq. 19]. [Eq. 19] can be solved by the method of least square as shown in [Eq. 20] next presented. With this, the control apparatus can obtain the kinematic parameter error $\Delta P$ with effects of rotational resistance $f_i$ eliminated.

$$\Delta R = A \cdot \Delta P \quad \text{[Eq. 19]}$$

$$\text{where, } \Delta R = \begin{bmatrix} \Delta r_1 - \Delta r_{f1} \\ \vdots \\ \Delta r_m - \Delta r_{fm} \end{bmatrix},$$

$$A = \begin{bmatrix} \frac{\partial g_1}{\partial p_1} & \cdots & \frac{\partial g_1}{\partial p_n} \\ \vdots & \ddots & \vdots \\ \frac{\partial g_m}{\partial p_1} & \cdots & \frac{\partial g_m}{\partial p_n} \end{bmatrix} \quad \text{[Eq. 20]}$$

where, $\Delta P$: error of kinematic parameter
$$\Delta P = (A^T A)^{-1} A^T \cdot \Delta R$$

FIG. 15A shows measurement results of the DBB trajectory after calibration is performed without subtracting effects of the amount of radius error $\Delta r_{fi}$ based on rotational resistance $f_i$ and FIG. 15B shows measurement results of DBB trajectory after calibration is performed with subtracting effects of the amount of radius error $\Delta r_{fi}$ based on rotational resistance $f_i$ subtracted as described above. FIG. 15A shows how deviation is generated because errors vary according to measurement directions and FIG. 15B indicates that this kind of deviation is comparatively little and the circularity of the DBB trajectory is improved. In addition, because in FIG. 15A, calibration is performed with the amount of radius error $\Delta r_{fi}$ on the basis of rotational resistance $f_i$ included and the amount of radius error $\Delta r_{fi}$ is identified as the kinematic parameter error $\Delta P$, too, the circularity error as a whole is comparatively large, but in FIG. 15B, it is able to confirm that the absolute value of the circularity error is reduced and the overall circularity is improved, too.

Now, at least a part of the calibration can be summarized as follows. It is a method for calibrating a parallel kinematic mechanism machine. The machine includes an end-effector connected to struts via a second universal joint; actuators that drive the struts; a control means for giving actuator command values to control each actuator; and a rotational resistance value storage means provided with the control means and can store rotational resistance value of the first universal joint and/or the second universal joint. Then, when the end-effector is positioned to a plurality of positions and postures, the position and/or posture is measured, or the distance from a fixed point is measured. Thereafter, based on the measurement values, kinematic parameters of the parallel kinematic mechanism machine is estimated and calibration is performed. In this method, when the control means calculates for estimating kinematic parameters, deformation error caused by rotational resistance of the first universal joint and/or the second universal joint is taken into account.

In addition, in a parallel kinematic mechanism machine including an end-effector connected to struts via the second universal joint, actuators that drive struts, a control means that controls each actuator by giving actuator command values, and a rotational resistance value storage means provided with the control means and can store rotational resistance values of the first universal joint and/or the second universal joint, the control means measures positions and/or postures or measures distance from a fixed point when the end effector is positioned to a plurality of positions and postures, and based on the measurement values, conducts calibration by estimating the kinematic parameters of the parallel kinematic mechanism machine, and takes into account deformation errors caused by rotational resistance of the first universal joint 2 and/or the second universal joint when the estimated value of the kinematic parameter related to the calibration is calculated.

Subsequently, explanation will be made on the estimation of rotational resistance $f_i$ preferably used for control concerning compensation of the actuator command value.

The first universal joint 2 and the second universal joint 5 have already been discussed but will be explained again. FIG. 16 is an explanatory diagram of the first universal joint 2. The first universal joint 2 has a gimbal structure using double rings. The outer ring 41 is rotatably supported to the frame 1 via an axis 42 in the radial direction. The inner ring 44 which has a axis 43 that crosses at right angles with the axis 42 is mounted as a joint by allowing a bearing 45 of the outer ring 41 to receive this axis. In this way, combining the two joints forms the first universal joint 2 of 2-degree of freedom, and the first universal joint 2 is configured by two passive rotational axes 60 and 61 which cross at right angles each other.

Figure 17:
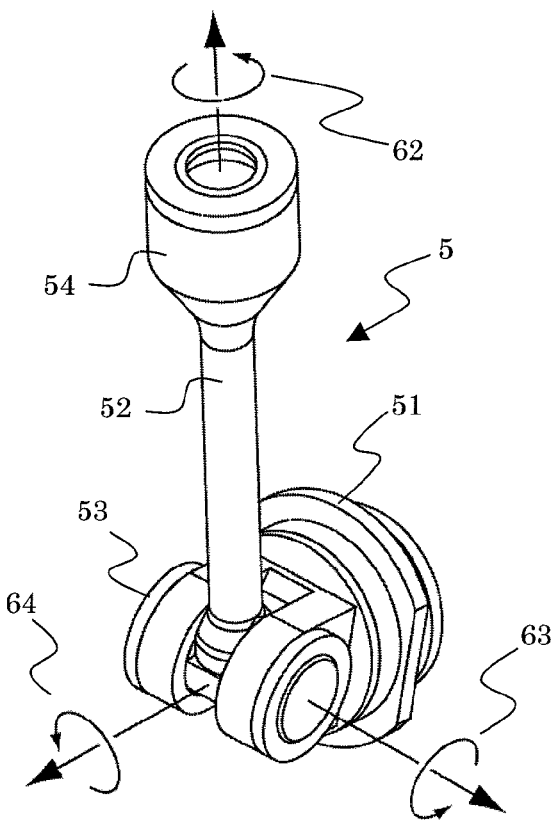
FIG. 17 is an explanatory view showing the second universal joint in FIG. 1.

FIG. 17 is an explanatory diagram of the second universal joint 5, and the second universal joint 5 includes a flange 51 and a shaft 52. The flange 51 is fixed perpendicularly to the side surface that crosses at right angles with the bottom surface of the end effector 6 (not shown in FIG. 17, but in this figure, located in the right rear), and rotates around the passive rotational axis 64. The shaft 52 is mounted to the flange 51 via a bearing 53, and rotates around the passive rotational axis 63 parallel to the side surface of the end-effector 6. On the other hand, at the end part on the side opposite to the bearing 53 in the shaft 52, a bearing 54 which rotates around the passive rotational axis 62 equivalent to the axis of the shaft 52 is mounted, and to this bearing 54, the ball screw 4 (not shown in FIG. 17) is inserted. In this way, the second universal joint 5 with 3-degree of freedom is formed by combinations of three bearings (joints) and the second universal joint 5 is configured by two passive rotational axes 63 and 64 which cross at right angles each other and a passive rotational axis 62 that oscillates around the passive rotational axis 63.

As described above, each leg axis system of the parallel kinematic mechanism machine has five pieces of passive rotational axes 60 through 64. Moreover, since six sets of leg axis systems exist, a total of 30 passive rotational axes exist in the whole parallel kinematic mechanism machine. Hereinafter, all the joints of the first universal joint 2 and the second universal joint 5 are called passive joints without distinction except for the case especially mentioned.

Figure 18:
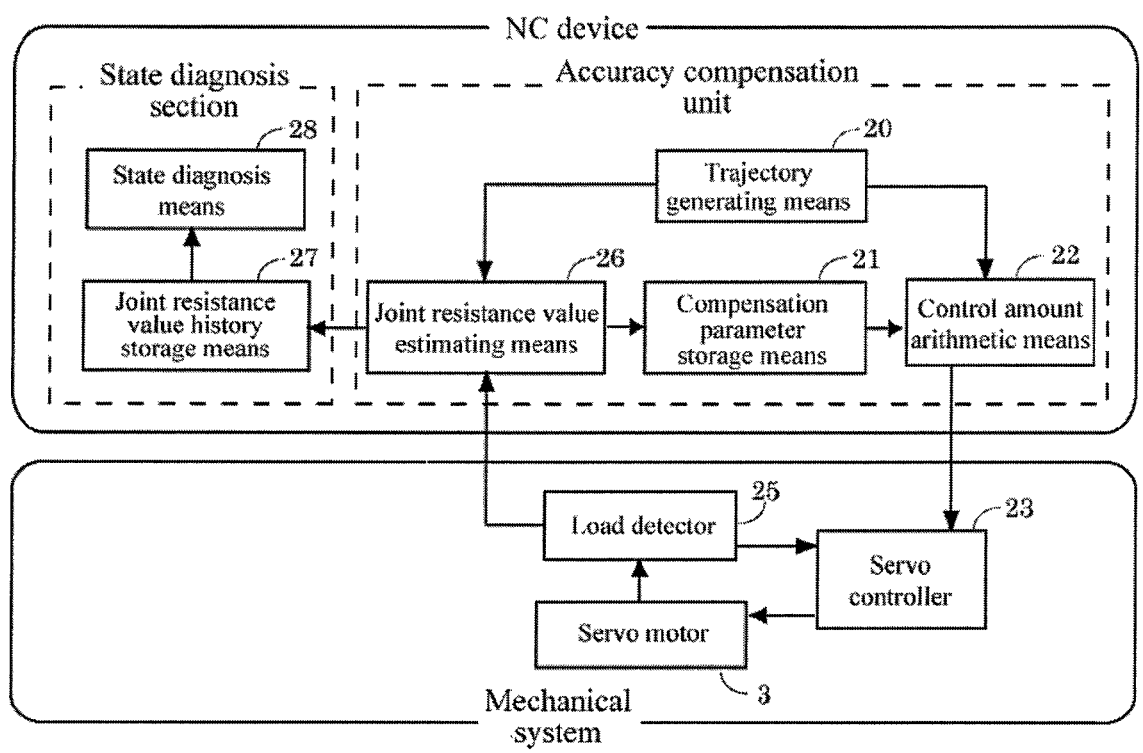
FIG. 18 is a block diagram of a part of control apparatus and control target related to the estimation of the rotational resistance value in the present invention.

FIG. 18 is a block diagram showing a control apparatus of a parallel kinematic mechanism machine as well as specific elements of a mechanical system as a part of targets for control. The control apparatus is configured by the use of an NC device, and includes a trajectory generating means 20, compensation parameter storage means 21, control amount arithmetic means 22, joint resistance value estimating means 26, joint resistance value history storage means 27, and state diagnosis means 28. Incidentally, former four means in these means are included in the accuracy compensation unit, and the latter two means are included in the state diagnosis unit. In addition, in each means, programs in the NC device are used.

The control apparatus generates a kinetic trajectory of the end-effector 6 in the trajectory generating means 20. The control apparatus determines the command value of each servo motor 3 by solving the inverse kinematic calculation of parallel kinematic mechanism in the control amount arithmetic means 22. The control apparatus gives these command values to the servo controller 23 which belongs to the mechanical system and the servo controller 23 drives corresponding servo motor 3 on the basis of the command value. To the servo motor 3, the load detector 25 which detects loads (drive power value) at the time of driving is installed, and these loads are able to be grasped or stored in the joint resistance value estimating means 26 of the control apparatus.

On the other hand, based on the kinetic trajectory generated by the trajectory generating means 20 and the rotational resistance of each passive joint on the basis of the load measurement value of the servo motor 3 measured by the load detector 25 is computed by the joint resistance value estimating means 26 as discussed later.

The rotational resistance value obtained in this way is used to update the content of the compensation parameter storage means 21 in order to use as new parameters when operation error of the end-effector 6 is compensated. Incidentally, with respect to the error estimation method or operation compensation with rotational resistance used as parameters, those mentioned above can be preferably used.

In addition, the rotational resistance value can be used for adding the content in the joint rotational resistance history storage means 27. The control apparatus refers to the joint rotational resistance history storage means 27 in the state diagnosis means 28 and grasps the rotational resistance and its changes, and thereby implements the state diagnosis of the parallel kinematic mechanism machine.

In the state diagnosis means 28 of the control apparatus, threshold of rotational resistance value of passive joints and threshold of amount of changes of rotational resistance value are stored in advance. For these threshold, data that indicates the boundary between the normal condition (level 1) and the state in which a large load begins to be applied to the passive joint or its sudden change appears but the accuracy can be maintained by compensating errors by the control apparatus (level 2), and the data that indicates the boundary between the relevant level 2 and the condition in which excessive load begins to be applied to the passive joint or excessive load changes occur (level 3) shall be set.

Figure 19:
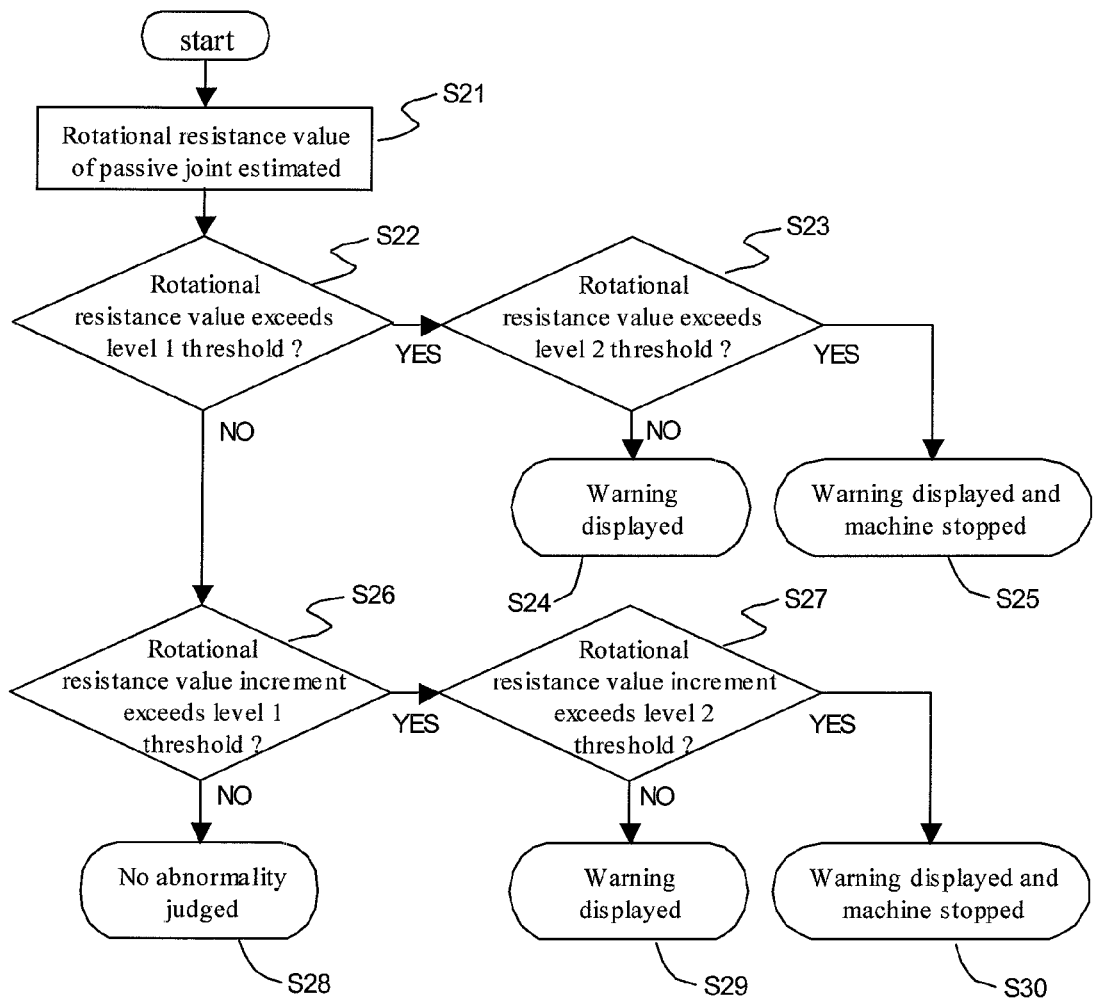
FIG. 19 is a flow chart of an embodiment related to the control method related to the estimation of the rotational resistance value in the present invention.
Figure 20:
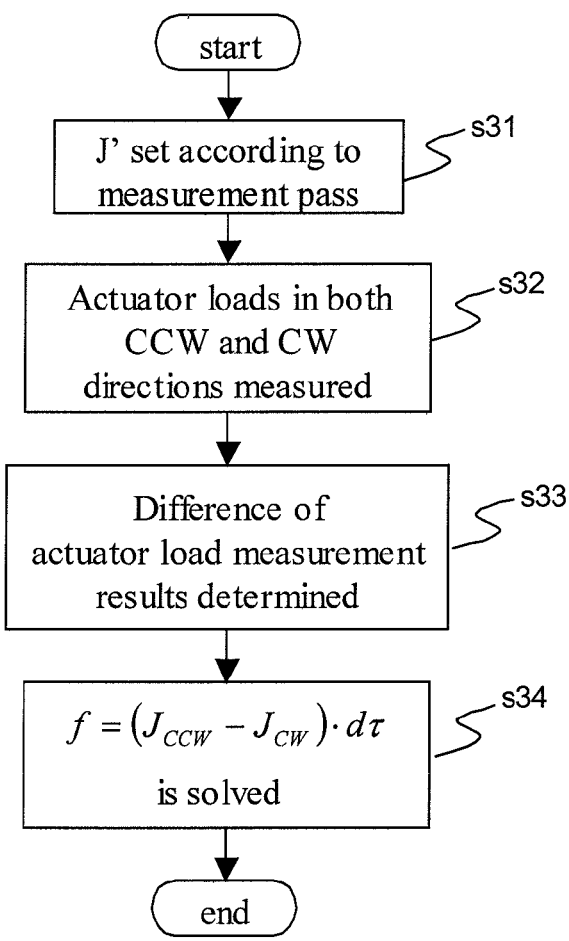
FIG. 20 is a flow chart of an embodiment related to the control method according to the estimation of the rotational resistance value in the present invention.

FIG. 19 and FIG. 20 show flow charts related to the control method which the control apparatus of the parallel kinematic mechanism machine that achieve the foregoing performs. First of all, the joint resistance value estimating means 26 of the control apparatus estimates the rotational resistance value of the passive joint as follows (step S21 of FIG. 19).

That is, as described above, in order to analyze effects of the passive axis in each leg axis system of the parallel kinematic mechanism machine, each leg axis system is assumed as a 6-degree of freedom serial link mechanism. Then, as shown in [Eq. 2], force and moment working on the second universal joint 5 can be expressed by the use of rotational resistance value of each passive joint.

On the other hand, resultant force and resultant moment (F) of the internal force working on the end-effector 6 can be expressed as per the foregoing [Eq. 3] by the use of the force or moment working on the link head end. Now, Ti denotes a transformation matrix from the second universal joint 5 to the end-effector 6 and is defined by the foregoing [Eq. 4].

From [Eq. 2] and [Eq. 3], the following [Eq. 21] can be deduced. On the other hand, from the statics relation of the parallel link mechanism, the relation of the following [Eq. 22] holds. Consequently, from [Eq. 21] and [Eq. 22], the relationship equation called [Eq. 23] can be obtained.

$$F = \sum_i T_i \cdot (Js_i^T)^{-1} \cdot f_i \qquad [\text{Eq. 21}]$$

$$F = Jp^T \cdot \tau \qquad [\text{Eq. 22}]$$

where, $J_{pi}$: Jacobian matrix of the parallel link mechanism
τ: load vector of each servo motor 3

$$Jp^T \cdot \tau = \sum_i T_i \cdot (Js_i^T)^{-1} \cdot f_i \qquad [\text{Eq. 23}]$$

Furthermore, when [Eq. 23] is represented by matrix, [Eq. 24] shown below is obtained. And when these relationship equations are formed into simultaneous equations with consideration given that this [Eq. 24] holds for all measurement points, it can be expressed like [Eq. 25] shown next, where n denotes the number of measurement points. Let J denote the first term on the right side of [Eq. 25]; then, using the quasi-inverse matrix $J^+$ of J, the rotational resistance vector f can be determined in the manner of least mean square approximation by [Eq. 26] shown below.

$$[\tau] = [\,(Jp^T)^{-1}T_1(Js_1^T)^{-1} \;\cdots\; (Jp^T)^{-1}T_6(Js_6^T)^{-1}\,] \cdot \begin{bmatrix} f_1 \\ \vdots \\ f_6 \end{bmatrix} \qquad [\text{Eq. 24}]$$

$$\begin{bmatrix} \tau_1 \\ \vdots \\ \tau_n \end{bmatrix} = \begin{bmatrix} (Jp_1^T)^{-1}T_{11}(Js_{11}^T)^{-1} & \cdots & (Jp_1^T)^{-1}T_{61}(Js_{61}^T)^{-1} \\ \vdots & \ddots & \vdots \\ (Jp_n^T)^{-1}T_{1n}(Js_{1n}^T)^{-1} & \cdots & (Jp_n^T)^{-1}T_{6n}(Js_{6n}^T)^{-1} \end{bmatrix} \cdot \begin{bmatrix} f_1 \\ \vdots \\ f_6 \end{bmatrix} \qquad [\text{Eq. 25}]$$

$$f = J^+ \cdot \tau \qquad \left( = (J^T \cdot J)^{-1} \cdot J^T \cdot \tau \right) \qquad [\text{Eq. 26}]$$

Loads of the servo motor 3 measured with the parallel kinematic mechanism machine actually driven include components by its own weight, components by inertia force, or the like in addition to components by rotational resistance of each passive joint. Consequently, in order to accurately estimate the rotational resistance of each passive joint, the component only by rotational resistance must be extracted from the rotational resistance vector f obtained by [Eq. 26]. However, it is possible to reduce the effects of inertia force to a minimum by operating the parallel kinematic mechanism machine at a low speed at the time of measurement. Thus, removal of the component by inertia is not considered since it can be ignored.

On the other hand, the component by its own weight depends only on the position and posture of the end-effector 6 and does not depend on the operating direction. Consequently, moving the end-effector 6 in the CCW direction (counterclockwise direction) or moving the end-effector 6 in the CW direction (clockwise direction) applies loads by same its own weight when they are compared at the same position and in the same posture on the same trajectory. Consequently, the component by its own weight can be eliminated by measuring loads of the servo motor 3 in these both directions and finding the differences for relevant measurement results. That is, when these differences are taken into account for [Eq. 25], the following [Eq. 27] is obtained, and by solving this [Eq. 27] for f in the same manner as [Eq. 25], [Eq. 28] is obtained. By this [Eq. 28], the rotational resistance vector f which represents the rotational resistance of the passive joint can be identified for each leg axis system. Now, when optional joints are excluded from the targets of identification, the corresponding components are eliminated from the right hand second term and the corresponding column vector is removed from the right hand first term of [Eq. 27] to form a matrix. By this, joints to be identified can be optionally chosen.

$$\begin{bmatrix} \tau_{1,CCW} - \tau_{1,CW} \\ \vdots \\ \tau_{n,CCW} - \tau_{n,CW} \end{bmatrix} = \begin{bmatrix} J_{11,CCW} - J_{11,CW} & \cdots & J_{61,CCW} - J_{61,CW} \\ \vdots & \ddots & \vdots \\ J_{1n,CCW} - J_{1n,CW} & \cdots & J_{6n,CCW} - J_{6n,CW} \end{bmatrix} \cdot \begin{bmatrix} f_1 \\ \vdots \\ f_6 \end{bmatrix} \qquad [\text{Eq. 27}]$$

$$f = (J_{CCW} - J_{CW})^+ \cdot (\tau_{CCW} - \tau_{CW}) \qquad [\text{Eq. 28}]$$

The joint resistance estimation means 26 of the control apparatus calculates the matrix J at each measurement point according to the measurement conditions based on the foregoing (step S31 of FIG. 20). Next, the joint resistance estimation means 26 measures loads of servo motor 3 (actuator) with respect to the CCW direction and the CW direction (step S32). Then, the joint resistance estimation means 26 takes the differences for these measurement results (step S33). And the joint resistance estimation means 26 solves [Eq. 28] using this difference and the matrix J on the basis of the program stored in advance to enable calculation corresponding to [Eq. 28] (step S34). In this way, in step S21 of FIG. 19, the joint resistance estimation means 26 estimates the rotational resistance of the passive joint from the loads of servo motor 3.

In step S22, the control apparatus compares the threshold (threshold of level 1 of the rotational resistance) related to levels 1 and 2 concerning rotational resistance stored in the state diagnosis means 28 with the rotational resistance value held in the joint rotational resistance history storage means 27. As a result, in the event that the rotational resistance value is less than this threshold (rotational resistance value≦threshold of level 1 of rotational resistance value), the control apparatus advances the processing to step S26. On the other hand, when the rotational resistance value exceeds the threshold (rotational resistance value> threshold of level 1 of rotational resistance), the control apparatus judges that any abnormality occurs for the passive joint related to the rotational resistance value and advances the processing to step S23.

In step S23, the control apparatus compares the threshold (threshold of level 2 of the rotational resistance value) related to levels 2 and 3 concerning rotational resistance value stored in the state diagnosis means 28 with the rotational resistance value held in the joint rotational resistance history storage means 27. As a result, in the event that the rotational resistance value is less than this threshold (rotational resistance value≦threshold of level 2 of rotational resistance value), the control apparatus advances the processing to step S24 and displays warnings that the rotational resistance value is greater than normal value or the passive joint that generates this kind of rotational resistance value or classification of the leg axis system to which the passive joint belongs. On the other hand, in the event that the rotational resistance value exceeds this threshold (rotational resistance value> threshold of level 2 of rotational resistance value), the control apparatus advances the processing to step S25 and stops operation of the parallel kinematic mechanism machine. Incidentally, the control apparatus displays that the machine is stopped at the time of this operation stop.

On the other hand, in step S26, the control apparatus compares the threshold (threshold of level 1 of the rotational resistance value increment) related to levels 1 and 2 concerning changes (increment) of the rotational resistance value stored in the state diagnosis means 28 with the rotational resistance value increment grasped from the rotational resistance history in the joint rotational resistance history storage means 27. As a result, in the event that the rotational resistance value increment is less than this threshold (rotational resistance value increment≦threshold of level 1 of rotational resistance value increment), the control apparatus advances the processing to step S28, judges that there is no abnormality as a result of diagnosis, and continues normal operation. On the other hand, in the event that the rotational resistance increment value exceeds this threshold (rotational resistance value increment> threshold of level 1 of rotational resistance value increment), the control apparatus judges that any abnormality occurs in the passive joint related to the rotational resistance value increment and advances the processing to step S27.

In step S27, the control apparatus compares the threshold related to levels 2 and 3 concerning the rotational resistance value increment stored in the state diagnosis means 28 (threshold of level 2 of the rotational resistance value increment) with the rotational resistance value increment obtained by referring to the joint rotational resistance history storage means 27. As a result, in the event that the rotational resistance value increment is less than this threshold (rotational resistance value increment≦threshold of level 2 of rotational resistance value increment), the control apparatus advances the processing to step S29, and displays warnings that the rotational resistance value is greater than normal value or the passive joint that generates this kind of rotational resistance value or classification of the leg axis system to which the passive joint belongs. On the other hand, in the event that the rotational resistance value increment exceeds this threshold (rotational resistance value increment> threshold of level 2 of rotational resistance value increment), the control apparatus advances the processing to step S30 and stops operation of the parallel kinematic mechanism machine. Incidentally, the control apparatus displays that the machine is stopped at the time of this operation stop.

In the foregoing control apparatus or control method, since the rotational resistance value of a passive joint is determined by the relationship of [Eq. 28] on the basis of the loads related to the servo motor 3 which is an actuator, estimation of high accuracy can be easily conducted.

Figure 21:
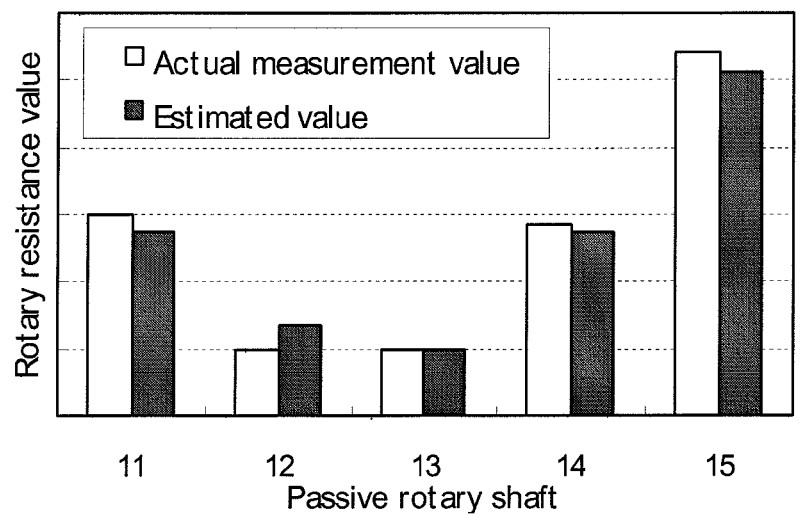
FIG. 21 is a graph showing measurement values of the rotational resistance value of a leg unit and the estimated values related to the present invention in the parallel kinematic mechanism machine of FIG. 1.

As FIG. 21, there shown is a graph which compares the estimated value of the rotational resistance value (black bar in FIG. 21) by [Eq. 28] with the actual measurement value of the rotational resistance value (white bar in FIG. 21) in each passive joint (reference numerals 11 through 15) with respect to one leg axis system (from first universal joint 2*a* to second universal joint 5*a*). The graph indicates that estimation with satisfactory accuracy by [Eq. 11] can be obtained.

In addition, as FIG. 22A through FIG. 22F, graphs are shown for comparison between waveforms of differences τi, CCW-τi and CW (input waveforms to [Eq. 11], shown in thin line in FIG. 22) of loads of servo motor 3 in each direction concerning relevant leg axis systems (it is FIG. 22A that involves first universal joint 2*a* through second universal joint 5*a*, and others are successively same) and waveforms (in solid line in FIG. 22) of the estimated value of loads obtained from the rotational resistance value of each passive joint estimated by [Eq. 28], where loads of corresponding servo motor 3 are taken as ordinate and the DDB (Double Ball Bar) phase angle (unit: deg.) taken as the abscissa. The graphs indicate that high agreement is obtained between the input waveforms and estimated results.

In the above-mentioned control apparatus or control method, it is judged whether or not the relevant rotational resistance value exceeds the threshold by the use of the rotational resistance value estimated in this way and when the rotational resistance exceeds the threshold, the passive joint related to the rotational resistance value is judged abnormal. Thus, operation of the parallel kinematic mechanism machine is stopped when the joint is judged abnormal, and breakage, deformation, abnormal functions, or the like can be prevented, which are generated by generating excessive rotational resistance or its changes in passive joints. Moreover, the state can be displayed when joints are judged abnormal before excessive rotational resistance or its change occurs so that attention of workers can be called.

By using the rotational resistance value estimated by the foregoing control apparatus or control method, the mechanism deformation error can be estimated and compensated as described above. Since the rotational resistance value can be estimated highly accurately as described above, the accuracy of this compensation is satisfactory. Moreover, since the rotational resistance value estimated as above can be calculated from actuator loads in a state with little computation amount, this compensation can also be easily implemented. FIG. 23 shows a graph that indicates the comparison of the DBB trajectory (CCW direction) estimated from the rotational resistance value estimation results in this case with the actual measurement value of DBB trajectory (CCW direction). The graph indicates satisfactory accuracy of deformation error compensation.

Needless to say, the machine controlled by the present invention shall not be limited to a parallel kinematic mechanism machine tool with 6-degree of space freedom. The degree of freedom should not be limited to 6-degree of freedom, either, but may be more or may be less than that. In addition, the universal joint should not be limited to combinations of 1-degree of freedom of rotation joints but may be spherical joints and joints of other construction. Furthermore, the machine should not be limited to a machine tool comprising cutting tools but may be robots, industrial machinery, amusement machinery, construction machinery, and others.

In addition, when the compensation amount of the actuator command value is determined from the resultant force working on the end-effector, the technique described in Japanese Patent Application Laid-Open No. 2005-186210 may not be used but compliance of mechanism elements may be used to determine the elastic deformation amount of the mechanism, the inverse transformation of the mechanism should be performed with the obtained elastic deformation amount taken into account, and the actuator command value after compensation may be directly determined.

What is claimed is:

1. A method for controlling a parallel kinematic mechanism machine having:
   a base fixed to the outside;
   a plurality of struts connected to the base via first universal joints;
   actuators which drive each strut;
   an end-effector connected to each strut via second universal joints;
   a control means for giving actuator command values to control each actuator; and
   a rotational resistance value storage means provided with the control means for storing rotational resistance values of the first universal joints and/or the second universal joints,
   the method comprising the steps of:
   a first step that determines each actuator command value for end-effector position command values and posture command values on the basis of predetermined kinematic parameters in the parallel kinematic mechanism machine;
   a second step that obtains rotational resistance values of first universal joints and/or second universal joints from the rotational resistance value storage means;
   a third step that computes the force and the moment exerted to each of the second universal joints by using the rotational resistance values;
   a fourth step that determines the resultant force and the resultant moment exerted to the end-effector from the force and the moment exerted to each of the second universal joints;
   a fifth step that computes an elastic deformation amount of a mechanism by using the resultant force and the resultant moment exerted to the end-effector and that computes the compensation amounts of the actuator command values using that amount; and
   a sixth step that updates the actuator command values determined in the first step with the compensation amounts determined in the fifth step taken into account,
   wherein in the third step, links comprising struts, first universal joints and second universal joints are regarded as independent serial link mechanisms, respectively, and the force and the moment exerted to connections between the strut and the end-effector by rotational resistance of universal joints in relevant serial link mechanisms are computed.

2. The method according to claim 1, wherein in the third step, changes of rotational resistance values at the time of reversal of the first universal joints or the second universal joints are approximated by linear functions.

3. The method according to claim 1, wherein in the third step, the moving average processing is performed for the rotational resistance values of the rotary shaft which reverses at the time of reversal of the first universal joints or the second universal joints.

4. The method according to claim 1, wherein said parallel kinematic mechanism machine further comprises load detectors that detect a load of each actuator, and the rotational resistance values are estimated on the basis of the load detected by the load detectors.

5. The method according to claim 4, wherein the control means updates storage of estimated rotational resistance value in the rotational resistance value storage means.

6. The method according to claim 1, wherein the rotational resistance values are estimated by a method comprising:
   estimating rotational resistance values of first universal joints and/or second universal joints as composing elements of rotational resistance vectors,
   by finding relevant rotational resistance vectors of first universal joints and/or second universal joints from load vectors configured by loads detected by the load detectors,
   in conformity to the fact that
   the equation that expresses the internal force exerted to the end-effector by rotational resistance of the first universal joint and/or second universal joint,
   by the use of the Jacobian matrix related to each leg unit and rotational resistance vectors of first universal joint and/or second universal joint by regarding each leg unit including each first universal joint, corresponding strut, and corresponding second universal joint as a serial link mechanism,
   is equal to
   the equation that expresses the internal force exerted to the end-effector by the rotational resistance of the first universal joint and/or second universal joint by the use of the Jacobian matrix of the parallel link mechanism and load vectors of each actuator from the statics relationship of the parallel link mechanism.

7. The method according to claim 6, wherein the control means updates storage of estimated rotational resistance value in the rotational resistance value storage means.

8. A control apparatus for a parallel kinematic mechanism machine comprising:
   a base fixed to the outside;
   a plurality of struts connected to the base via first universal joints;
   actuators which drive each strut;
   an end-effector connected to each strut via second universal joints;
   a control means for giving actuator command values to control each actuator; and
   a rotational resistance value storage means provided with the control means for storing rotational resistance values of the first universal joints and/or the second universal joints, wherein the apparatus comprises:
   an actuator command value computing means to determine each actuator command value for end-effector position command values and posture command values on the basis of predetermined kinematic parameters in the parallel kinematic mechanism machine;
   a resultant force computing means that computes the force and the moment exerted to each of the second universal joints using the rotational resistance values obtained by rotational resistance value storage means, and determines the resultant force and the resultant moment exerted to the end-effector from the computed force and the moment exerted to each of the second universal joints;
   a compensation amount computing means that computes an elastic deformation amount of a mechanism by using the resultant force and the resultant moment exerted to the end-effector, and computes the compensation amounts of the actuator command values using that amount; and the control means that updates the actuator command values determined by the actuator command value computing means taking the compensation amounts determined by the compensation amount computing means into account, wherein the resultant force computing means regards links comprising struts, first universal joints, second universal joints as independent serial link mechanisms, respectively, and computes the force and the moment exerted to connections between the strut and the end-effector by rotational resistance of universal joints in relevant serial link mechanisms.

9. The control apparatus according to claim 8, wherein the resultant force computing means approximates changes of rotational resistance values at the time of reversal of the first universal joints or the second universal joints by linear functions.

10. The control apparatus according to claim 8, wherein the resultant force computing means performs the moving average processing for the rotational resistance values of the rotary shaft which reverses at the time of reversal of the first universal joints or the second universal joints.

11. The control apparatus according to claim 8, wherein said parallel kinematic mechanism machine further comprises load detectors that detect a load of each actuator, and the rotational resistance values are estimated on the basis of the load detected by the load detectors.

12. The control apparatus according to claim 11, wherein the control apparatus updates storage of rotational resistance value estimated in the rotational resistance value storage means.

13. The control apparatus according to claim 8, wherein the rotational resistance values are estimated by a method comprising:

finding relevant rotational resistance vectors of first universal joints and/or second universal joints from load vectors configured by loads detected by the load detectors, in conformity to the fact that the equation that expresses the internal force exerted to the end-effector by rotational resistance of the first universal joint and/or the second universal joint, by the use of the Jacobian matrix related to each leg unit and rotational resistance vectors of the first universal joint and/or second universal joint by regarding each leg unit including each first universal joint, corresponding strut, and corresponding second universal joint as a serial link mechanism, is equal to the equation that expresses the internal force exerted to the end-effector by the rotational resistance of the first universal joint and/or the second universal joint by the use of the Jacobian matrix of the parallel link mechanism and load vectors of each actuator from the statics relationship of the parallel link mechanism.

14. The control apparatus according to claim 13, wherein the control apparatus updates storage of rotational resistance value estimated in the rotational resistance value storage means.

15. A method for controlling a parallel kinematic mechanism machine having an end-effector to be connected to each strut via second universal joints, actuators that drive each strut, a control means to control each actuator by giving actuator command values, and a rotational resistance value storing means provided with the control means for storing rotational resistance values of first universal joints and/or second universal joints, comprising the steps of:

measuring the position and/or posture or measuring the distance from a fixed point when the end-effector is positioned to a plurality of positions and postures, estimating kinematic parameters of the parallel kinematic mechanism machine and performing calibration on the basis of the actual measurement values, and taking into account deformation errors by rotational resistance of the first universal joints and/or the second universal joints when computation is made to estimate the kinematic parameters by the control means, wherein links comprising struts, first universal joints and second universal joints are regarded as independent serial link mechanisms, respectively, and the force and the moment exerted to connections between the strut and the end-effector by rotational resistance of universal joints in relevant serial link mechanisms are computed.

16. A control apparatus for a parallel kinematic mechanism machine having an end-effector to be connected to each strut via second universal joints, actuators that drive each strut, a control means to control each actuator by giving actuator command values, and a rotational resistance value storing means provided with the control means for storing rotational resistance values of first universal joints and/or second universal joints, wherein the control means measures the position and/or posture or measures the distance from a fixed point when the end-effector is positioned to a plurality of positions and postures, estimates kinematic parameters of the parallel kinematic mechanism machine and performs calibration on the basis of the actual measurement values, and takes into account deformation errors by rotational resistance of the first universal joints and/or the second universal joints when computation is made to estimate the kinematic parameters by the calibration, wherein links comprising struts, first universal joints and second universal joints are regarded as independent serial link mechanisms, respectively, and the force and the moment exerted to connections between the strut and the end-effector by rotational resistance of universal joints in relevant serial link mechanisms are computed.

17. A method for controlling a parallel kinematic mechanism machine having a base fixed to the outside; a plurality of struts each being connected to the base via first universal joints; respective actuators for driving each strut; an end-effector connected to each strut via respective second universal joints; and load detectors that detect a load of each actuator, the method comprising the step of:

estimating rotational resistance values of the first universal joints and/or the second universal joints on the basis of the load detected by the load detectors.

18. The method according to claim 17, wherein when each estimated rotational resistance value of first universal joints and/or second universal joints exceeds the predetermined threshold, judgment is made that any abnormality occurs in the first universal joint or the second universal joint related to the rotational resistance value.

19. A method for controlling a parallel kinematic mechanism machine having a base fixed to the outside; a plurality of struts each being connected to the base via first universal joints; respective actuators for driving each strut; an end-effector connected to each strut via respective second universal joints; and load detectors that detect a load of each actuator, the method comprising the step of:

estimating rotational resistance values of first universal joints and/or second universal joints as composing elements of rotational resistance vectors, by finding relevant rotational resistance vectors of first universal joints and/or second universal joints from load vectors configured by loads detected by the load detectors, in conformity to the fact that the equation that expresses the internal force exerted to the end-effector by rotational resistance of the first universal joint and/or second universal joint, by the use of the Jacobian matrix related to each leg unit and rotational resistance vectors of first universal joint and/or second universal joint by regarding each leg unit including each first universal joint, corresponding strut, and corresponding second universal joint as a serial link mechanism, is equal to the equation that expresses the internal force exerted to the end-effector by the rotational resistance of the first universal joint and/or second universal joint by the use of the Jacobian matrix of the parallel link mechanism and load vectors of each actuator from the statics relationship of the parallel link mechanism.

20. The method according to claim 19, wherein when each estimated rotational resistance value of first universal joints and/or second universal joints exceeds the predetermined threshold, judgment is made that any abnormality occurs in the first universal joint or the second universal joint related to the rotational resistance value.

21. A control apparatus for a parallel kinematic mechanism machine, comprising:

a base fixed to the outside;

a plurality of struts each being connected to the base via first universal joints;

respective actuators for driving each strut;

an end-effector connected to each strut via respective second universal joints; and load detectors that detect a load of each actuator, wherein rotational resistance values of the first universal joint and/or the second universal joint are estimated on the basis of the load detected by the load detector.

22. The control apparatus according to claim 21, wherein when each estimated rotational resistance value of first universal joints and/or second universal joints exceeds the predetermined threshold, judgment is made that any abnormality occurs in the first universal joint and/or the second universal joint related to the rotational resistance value.

23. A control apparatus that controls actuators in a parallel kinematic mechanism machine, comprising:

a base fixed to the outside;

a plurality of struts each being connected to the base via first universal joints;

respective actuators for driving each strut;

an end-effector connected to each strut via respective second universal joints; and load detectors that detect a load of each actuator, wherein rotational resistance values of first universal joints and/or second universal joints as composing elements of rotational resistance vectors are estimated, by finding relevant rotational resistance vectors of first universal joints and/or second universal joints from load vectors configured by loads detected by the load detectors, in conformity to the fact that the equation that expresses the internal force exerted to the end-effector by rotational resistance of the first universal joint and/or the second universal joint, by the use of the Jacobian matrix related to each leg unit and rotational resistance vectors of the first universal joint and/or second universal joint by regarding each leg unit including each first universal joint, corresponding strut, and corresponding second universal joint as a serial link mechanism, is equal to the equation that expresses the internal force exerted to the end-effector by the rotational resistance of the first universal joint and/or the second universal joint by the use of the Jacobian matrix of the parallel link mechanism and load vectors of each actuator from the statics relationship of the parallel link mechanism.

24. The control apparatus according to claim 23, wherein when each estimated rotational resistance value of first universal joints and/or second universal joints exceeds the predetermined threshold, judgment is made that any abnormality occurs in the first universal joint and/or the second universal joint related to the rotational resistance value.

* * * * *